(12) United States Patent
Richardson et al.

(10) Patent No.: US 12,723,612 B2
(45) Date of Patent: Sep. 1, 2026

(54) CONNECTOR ASSEMBLY AND METHOD OF MAKING

(71) Applicant: Zephyros, Inc., Romeo, MI (US)

(72) Inventors: Henry E. Richardson, Romeo, MI (US); David Edward Compeau, Romeo, MI (US); Craig Langevin, Romeo, MI (US); Joseph R. Thomas, Romeo, MI (US); Peter Cate, Romeo, MI (US); Satindar Singh Dua, Maharashtra (IN)

(73) Assignee: ZEPHYROS, INC., Romeo, MI (US)

( * ) Notice: Subject to any disclaimer, the term of this patent is extended or adjusted under 35 U.S.C. 154(b) by 532 days.

(21) Appl. No.: 18/030,348

(22) PCT Filed: Oct. 7, 2021

(86) PCT No.: PCT/US2021/054018
§ 371 (c)(1),
(2) Date: Apr. 5, 2023

(87) PCT Pub. No.: WO2022/076718
PCT Pub. Date: Apr. 14, 2022

(65) Prior Publication Data

US 2023/0375022 A1 Nov. 23, 2023

Related U.S. Application Data

(60) Provisional application No. 63/185,771, filed on May 7, 2021, provisional application No. 63/089,397, filed on Oct. 8, 2020.

(51) Int. Cl.
*F16B 11/00* (2006.01)
*B62K 19/22* (2006.01)
(Continued)

(52) U.S. Cl.
CPC ........... *F16B 11/006* (2013.01); *C09J 163/00* (2013.01); *F16B 9/01* (2018.08); *B62K 19/22* (2013.01)

(58) Field of Classification Search
CPC ........ F16B 9/01; F16B 11/006; F16B 11/008; Y10T 403/47; C09J 163/00–12; B62K 19/06; B62K 19/22
See application file for complete search history.

(56) References Cited

U.S. PATENT DOCUMENTS 3,225,862 A * 12/1965 Fink ...................... F16B 11/006 182/228.1
3,847,694 A * 11/1974 Stewing .................. F16L 47/06 156/303.1
(Continued)

FOREIGN PATENT DOCUMENTS

DE 939848 C 3/1956
DE 2827737 A1 2/1979
(Continued)

OTHER PUBLICATIONS

International Search Report & Written Opinion, PCT Application No. PCT/US2021/054018 dated Feb. 1, 2022.

*Primary Examiner* — Amber R Anderson
*Assistant Examiner* — Kevin J Baynes
(74) *Attorney, Agent, or Firm* — The Dobrusin Law Firm, P.C.

(57) ABSTRACT

The present teachings generally relate to a frame assembly comprising a connector device and a method for fabricating the same. The frame assembly comprises a member (12) and one or more connector devices (14A, 14B) coupled to and supporting opposing ends the member. Each of the one or more connector devices comprise a base member; a first projection extending from a first side of the base member, the projection defining a cavity; an end channel situated
(Continued)

within the cavity and extending around a perimeter of the projection proximate the base member; a port extending from the end channel on the first side of the base member to a second side of the base member, the second side being in opposing relationship to the first side; and an adhesive, introduced via the port, situated within the end channel. Opposing ends of the member are situated within each of the cavities of two connector devices, respectively, and in contacting relationship with the adhesive.

19 Claims, 10 Drawing Sheets

(51) Int. Cl.
*C09J 163/00* (2006.01)
*F16B 9/00* (2006.01)

(56) References Cited

U.S. PATENT DOCUMENTS

| | | | | | |
|---|---|---|---|---|---|
| 3,920,787 | A * | 11/1975 | McDowell | B29C 66/52292 264/263 |
| 4,256,333 | A * | 3/1981 | Jones | B29C 65/4895 285/915 |
| 4,299,508 | A * | 11/1981 | Kerscher | B29C 66/24244 403/267 |
| 4,561,670 | A * | 12/1985 | Takada | B29C 65/483 280/281.1 |
| 4,583,755 | A * | 4/1986 | Diekman | B62K 19/22 280/281.1 |
| 4,585,246 | A * | 4/1986 | Diekman | B62K 19/30 280/281.1 |
| 4,721,407 | A * | 1/1988 | Liu | F16B 2/00 403/267 |
| 4,896,991 | A * | 1/1990 | Yashuhara | F16B 7/20 285/422 |
| 4,900,049 | A * | 2/1990 | Tseng | B62K 19/22 280/281.1 |
| 5,059,057 | A * | 10/1991 | Graef | A61F 2/3607 403/292 |
| 5,160,688 | A * | 11/1992 | Hockett | F16L 37/101 285/915 |
| 5,228,259 | A * | 7/1993 | Haddad | B62D 33/044 52/653.2 |
| 5,403,045 | A * | 4/1995 | Kocian | F16B 3/005 285/286.1 |
| 5,404,630 | A * | 4/1995 | Wu | B29C 66/1122 29/523 |
| 5,421,781 | A * | 6/1995 | Mackellar | F16D 1/068 464/181 |
| 5,427,198 | A * | 6/1995 | Walsh | E06C 7/087 182/228.4 |
| 5,613,794 | A * | 3/1997 | Isaac | B29C 66/1222 280/281.1 |
| 5,984,369 | A * | 11/1999 | Crook | F16B 7/025 285/915 |
| 8,262,155 | B2 * | 9/2012 | Leanza | B62D 27/02 296/205 |
| 8,844,457 | B2 * | 9/2014 | Buzzi | B29C 66/43421 114/78 |
| 8,876,425 | B2 * | 11/2014 | Wilson | C23F 13/06 403/267 |
| 9,593,785 | B2 * | 3/2017 | Koehler | F16B 11/006 |
| 10,781,840 | B2 * | 9/2020 | Sikorski | B29C 66/612 |
| 10,935,062 | B2 * | 3/2021 | Sutter | F16B 7/048 |
| 11,180,199 | B2 * | 11/2021 | Munzinger | B62D 27/026 |
| 11,279,190 | B2 * | 3/2022 | Rupflin | B60G 7/001 |
| 11,286,970 | B2 * | 3/2022 | Fuchs | F16B 9/01 |
| 2004/0155518 | A1 * | 8/2004 | Schlanger | B60B 21/062 301/58 |
| 2007/0051465 | A1 * | 3/2007 | Naughton | B29C 66/7212 156/305 |
| 2011/0158741 | A1 * | 6/2011 | Knaebel | B62D 27/026 156/293 |
| 2012/0235401 | A1 * | 9/2012 | Richardson | B62D 29/002 285/285.1 |
| 2014/0376995 | A1 * | 12/2014 | Faass | F16B 11/008 156/305 |
| 2016/0123380 | A1 | 5/2016 | Godon | |
| 2016/0200182 | A1 * | 7/2016 | Ogawa | B21D 39/028 403/267 |
| 2018/0134919 | A1 * | 5/2018 | Greve | C09J 5/06 |
| 2019/0292769 | A1 | 9/2019 | Yahav | |

FOREIGN PATENT DOCUMENTS

| | | | | |
|---|---|---|---|---|
| DE | 3132828 A1 * | 3/1983 | F16B 11/008 |
| EP | 0780279 A1 | 6/1997 | |
| JP | S5739825 U | 3/1982 | |
| WO | WO-2016149700 A1 * | 9/2016 | C08G 59/4269 |
| WO | WO-2019224018 A1 * | 11/2019 | B29C 65/665 |
| WO | WO-2020049261 A1 * | 3/2020 | F16B 11/008 |

* cited by examiner 14A
30
32
42
60
36A
40
44
38
60
36B
42

14A
30
34
44

16
12
60
62
42

60
44

60

16
12
60
42
62

16
60

44
62
16
60
40
42

CONNECTOR ASSEMBLY AND METHOD OF MAKING

CROSS REFERENCE TO RELATED APPLICATIONS

This application is a national stage, under 35 U.S.C. 371, of PCT/US2021/054018 (filed Oct. 7, 2021), which claims priority to U.S. Provisional Application No. 63/089,397 (filed Oct. 8, 2020) and U.S. Provisional Application No. 63/185,771 (filed May 7, 2021).

FIELD

The present teachings generally relate to a connector assembly comprising a bracket and a method of fabricating the same. The bracket may be particularly advantageous in securing and supporting a structure.

BACKGROUND

Connector devices are conventionally used to affix a member to a frame or structure. The connector device may be a bracket fabricated from metal, which allows members to be welded to the brackets. However metal brackets are typically heavier as compared to polymer brackets, which results in a heavier weight of the overall frame or structure. Furthermore, welding operations during fabrication can be expensive. One solution contemplated by the present disclosure is to provide a polymer bracket that can be molded, for instance by injection molding, to achieve a lighter weight of the frame or structure. In addition to the consideration of weight, it is necessary to ensure that the polymer bracket has the requisite strength and structural integrity to support normal loads that may be exerted on the particular structure, which may include the body weight of persons using the structure as well as the added weight of objects that the persons may be carrying. Furthermore, an important consideration includes a suitable coupling between the bracket and the member to ensure the longevity of the coupling after repeated use of the structure. Even further, forming the coupling should be conducive to minimizing the complexity and the cost of manufacturing.

The connector devices (e.g., brackets) described herein may have particular applicability to frame-like structures designed to carry human weight such as ladders, bicycles, scooters, painting platforms, furniture (e.g., bed frames, couches, chairs etc.), or other structures including a frame.

It would be desirable to provide a connector assembly comprising a bracket that is fabricated from a polymer that can be molded.

It would be desirable to provide a connector assembly comprising a bracket that can be coupled to a member such that the structural integrity of the member can be maintained throughout repeated pressure and weight placed on the member and so that said coupling can withstand compression, bending, and torsion forces imparted by repeated usage of the member.

It would be desirable to provide a connector assembly whereby the coupling between a bracket and a member can be formed with relative ease so that manufacturing complexity and cost can be minimized.

SUMMARY

The present disclosure relates to a connector device for connecting frame members, which may address at least some of the needs identified above. The connector device may comprise a base member. The connector device may comprise a first projection extending from a first side of the base member. The projection may define a cavity. The connector device may comprise an end channel situated within the cavity and extending around a perimeter of the projection proximate the base member. The connector device may comprise a port extending from the end channel on the first side of the base member to a second side of the base member, the second side being in opposing relationship to the first side. The connector device may comprise an adhesive, introduced via the port, situated within the end channel.

The present disclosure relates to a frame assembly, which may address at least some of the needs identified above. The frame assembly may comprise a member and two connector devices coupled to and supporting opposing ends the member. Each of the two connector devices may comprise a base member. Each of the two connector devices may comprise a first projection extending from a first side of the base member. The first projection may define a cavity. Each of the two connector devices may comprise an end channel situated within the cavity and extending around a perimeter of the projection proximate the base member. Each of the two connector devices may comprise a port extending from the end channel on the first side of the base member to a second side of the base member, the second side being in opposing relationship to the first side. Each of the two connector devices may comprise an adhesive, introduced via the port, situated within the end channel. The opposing ends of the member may be situated within each of the cavities of the two connector devices, respectively, and in contacting relationship with the adhesive.

The frame assembly may comprise a member and a connector device for connecting the member to other members of the frame assembly. The connector device may include a cavity for receiving the member. One or more of the member and connector device may include a port for receiving an adhesive. The adhesive may adhere the member to the connector device. The connector device may be shaped to receive a portion of the member. The adhesive may be disposed into the connector device prior to inserting the member into the connector device. The adhesive may be disposed into the member prior to inserting the member into the connector device. The adhesive may adhere upon contact with one or more of the connector device or the member. The adhesive may be activated by a stimulus to adhere. The adhesive may be applied in a substantially solid state. The adhesive may be applied in a viscous state such that it flows into contact with one or more of the connector device and member.

The present disclosure relates to a method for fabricating a frame assembly, which may address at least some of the needs identified above. The method may comprise providing a connector device. The connector device may comprise a base member. The base member may include a first projection extending from a first side, the first projection defining a cavity. The method may comprise situating an end of a member within the cavity and into contacting relationship with an end channel situated within the cavity. The method may comprise injecting an adhesive into the end channel via a port, in fluid communication with the end channel. The port may extend from a second side of the base member to the first side of the base member, the second side opposing the first side. The adhesive may permeate the end channel.

The present disclosure relates to a frame assembly, which may address at least some of the needs identified above. The frame assembly may comprise an elongated member and a connector device including a cavity within the connector device. One or more channels may be situated within the cavity and extending around an interior perimeter of the connector device. A port may be located adjacent at least one of the channels in a wall portion of the connector device. The frame assembly may comprise an adhesive, introduced via the port, situated within the channel.

The frame assembly may be a bicycle frame. The frame assembly may be a ladder frame.

The frame assembly may comprise a port located along a wall of the elongated member.

The adhesive may be a two-part adhesive. A first component of the adhesive may be located into the elongated member and the second component of the adhesive may be located on the connector portion so that the adhesive adheres upon contact between the first component and second component of the adhesive.

The two-part adhesive may be a two-part phosphate ester elastomeric epoxy composition.

The two-part phosphate ester elastomeric epoxy composition may comprise a first component. The first component may include one or more epoxy resins, which may be liquid or solid epoxy resins, flexible epoxy resins, or aliphatic multifunctional epoxy resins; one or more reactive diluents; one or more first component additives; or any combination thereof. The second component may include one or more phosphate esters including a first phosphate ester, an optional second phosphate ester, and an optional third phosphate ester; one or more second component additives; or any combination thereof.

The frame assembly may comprise two or more of the connector devices. The two or more connector devices may receive the adhesive from a single port.

At least one of the channels of each of the two or more connector devices may fluidly communicate with each other. Adhesive may enter one of the connector devices through a port in fluid communication with at least one of the channels thereof and the adhesive may flow from the at least one channel into one or more channels of one or more other connector devices.

The channels may include one or more end channels, one or more peripheral channels, or both. The one or more end channels may be located on a base portion. The one or more peripheral channels may be located on a projection extending from the base portion and defining the cavity, or may be defined by a space between the projection and the elongated member. The one or more peripheral channels may be defined by a groove formed into the projection. Two or more of the channels may fluidly communicate with one another.

The present disclosure relates to a method for fabricating a frame assembly, which may address at least some of the needs identified above. The method may comprise providing an elongated member with an inner perimeter. The method may comprise dispensing an adhesive on the inner perimeter. The method may comprise mating the elongated member to a connector device such that the adhesive contacts the connector device.

The adhesive may comprise a first part and a second part. The method may comprise dispensing the first part or the second part on the inner perimeter and dispensing the other part on the connector device.

The method may comprise introducing additional adhesive through a port located on the connector device.

The port may fluidly communicate with one or more channels defined between the elongated member and the connector device.

In addition to or in alternative to dispensing the adhesive on the inner perimeter, the method may comprise locating the adhesive within one or more channels of the elongated member.

The method may comprise curing the adhesive at a temperature of about 0° C. to about 50° C.

DETAILED DESCRIPTION

Figure 1:
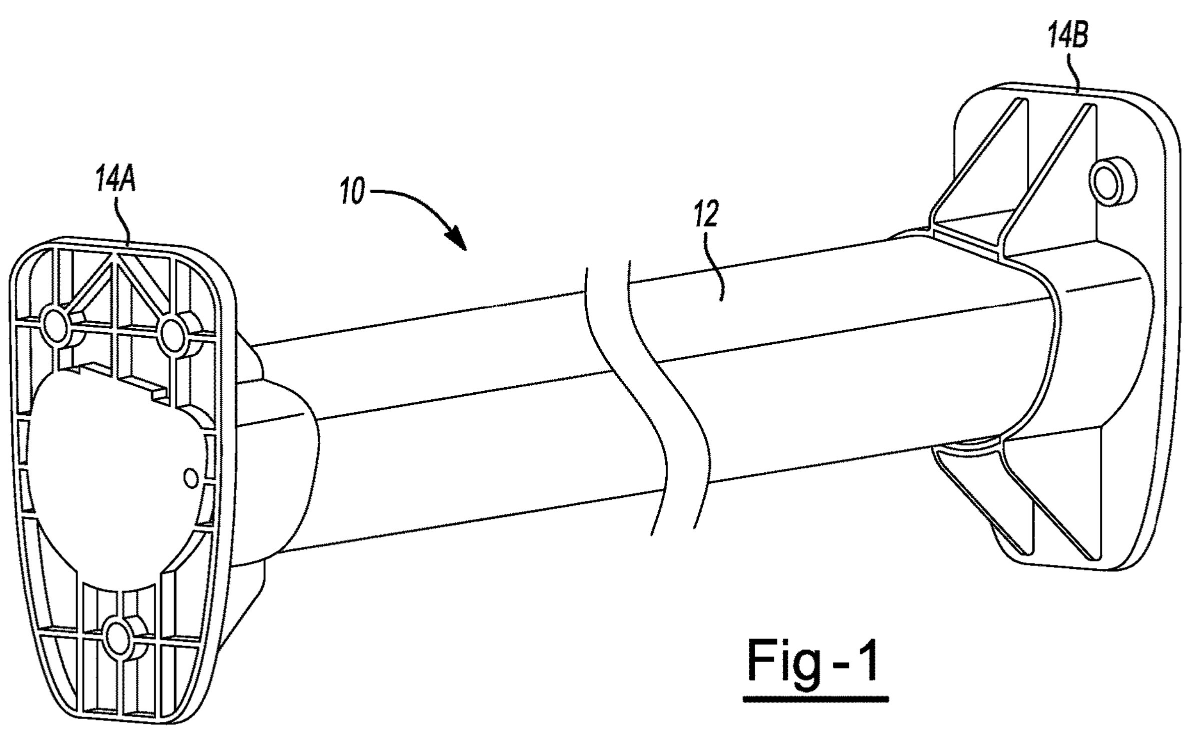
FIG. 1 shows a perspective view of an exemplary frame assembly in accordance with the present teachings.

The present teachings meet one or more of the above needs by the improved frame assembly comprising a connector device (e.g., bracket) and a method of fabricating the same described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide for a frame assembly. The frame assembly may function to support the weight of persons and/or objects, enable persons to climb onto structures, affix onto a frame and/or structure, or any combination thereof.

The frame assembly may cooperate with a frame and/or structure. By way of example, the frame assembly may include a rung supported by a ladder frame to which the rung is coupled via connector devices (e.g., brackets). The frame assembly may extend between two or more frames and/or two or more portions of a structure. The frame assembly may be supported by a frame and/or structure. The frame and/or structure may comprise one or more frame assemblies. The frame assemblies may be evenly and/or unevenly spaced along the frame and/or structure. The frame assemblies may be permanently or removably affixed to a frame and/or structure.

The frame may comprise one or more elongate and/or generally straight members conventionally used to construct ladders. The ladders may include step ladders, extension ladders, platform ladders, step stools, multi-purpose ladders, folding ladders, telescopic ladders, A-frame ladders, podium ladders, the like, or any combination thereof.

The structure may comprise any suitable structure to which one or more frame assemblies may be directly attached. The structure may include vehicles, buildings, machinery, scaffolding, the like, or any combination thereof.

The frame assembly may comprise one or more members (e.g., steps), one or more brackets, adhesive, or any combination thereof.

The frame assembly may comprise one or more members (e.g., steps). The members may function to support the weight of persons and/or objects, enable persons to climb onto structures, or both.

The members may include steps, rungs (e.g., ladder rung), platforms, bicycle frames, scooter frames, furniture frames, the like, or any combination thereof.

The members may be generally elongate. The members may be generally straight, curved, bent, or any combination thereof. The members may include two opposing ends. The ends may be open, closed, or both. The open ends may expose a hollow interior and/or one or more cores encapsulated by a shell. The closed ends may cap-off a hollow interior and/or one or more cores encapsulated by a shell.

The members may comprise a shaped profile as viewed along a longitudinal axis of the members. The shaped profile may be circular, ovoid, square, rectangular, truncated circular, the like, or any combination thereof, although other shapes are contemplated by the present disclosure. The shaped profile may be generally the same as the shaped profile of the projections of connector devices, as described herein.

The members may be solid, hollow, or both. The one or more members may comprise a shell, one or more cores, or both. The shell may define a shape of the members. The shell may extend around the perimeter of the members. The cores may structurally reinforce the members. The shell may include one or more textured portions. The textured portions may function to provide grip (e.g., to feet or shoes of users) to prevent slippage from the members. The textured portions may comprise one or more projections extending from the outer surface of the shell, one or more bumps extending from the outer surface of the shell, one or more grooves formed into the outer surface of the shell, or any combination thereof.

The members may be rigid, flexible, or both. The members may be molded, extruded, pultruded, the like, or any combination thereof. The extrusion and/or the pultrusion may be continuous or cut to desired dimensions.

The members may comprise one or more materials. The materials may include metal, polymer, or both. The metal may include aluminum, magnesium, titanium, steel, or any combination thereof. The polymer may be a thermoset or a thermoplastic. The polymer may include polyamide, polyester, polypropylene, polyethylene, polysulfone, thermoplastic imide, polyether imide, polyether sulfone, or any combination thereof. The polyamide may include nylon 6, nylon 6,6, or both. A non-limiting example of a suitable polyamide may include Ultramid® D3WG12 HMG, commercially available from BASF Corporation.

The polymer may include a reinforcement material. The reinforcement material may include fiber reinforcement, mineral reinforcement, or both. The fiber reinforcement may include glass fibers, polyamide fibers (e.g., Kevlar®), carbon fibers, ceramic fibers, nylon fibers, the like, or any combination thereof. The mineral reinforcement may include wollastonite, pyrophyllite, sauconite, saponite, nontronite, montmorillonite, silica, calcium, diatomaceous earth, clay, the like, or any combination thereof. A non-limiting example of a suitable fiber reinforcement may include 366 Type 30® Single End Roving, commercially available from Owens Corning.

The frame assembly may comprise one or more connector devices (e.g., brackets) (e.g., connector devices). The brackets may function to affix to a frame and/or structure, support one or more members, or both.

The connector devices may comprise a base member that is configured to couple to a frame and/or structure. The connector devices may comprise projections and/or cavities that are configured to couple to members (e.g., steps). The projections and/or cavities may act as a male connector or a female connector. The projections may extend from the base member. The base member and the projections may be fabricated as a unitary construction. The connector devices may be injection-molded.

The connector devices may include one or more ribs. The ribs may function to increase the structural support of the connector devices. The ribs may be connected to the base member, the projections, or both. The ribs may extend between the base plate and the projections. The ribs may extend within the base member. The ribs may extend within the base member longitudinally, transversely, or at any angle therebetween.

The connector devices may include one or more through-holes. The through-holes may function to receive fasteners to secure the connector devices to a frame and/or structure. The through-holes may extend between opposing sides of the base member. The through-holes may be located anywhere on the base member. The connector devices may couple to ends of a member (e.g., step or bicycle frame).

The connector devices may be provided as pairs of connector devices that couple to opposing ends of a member. Each of the brackets in a pair may be a mirror-image of the other. The pairs of brackets may include a left-hand bracket, a right-hand bracket, or both. The connector devices may comprise a base member, one or more sides, one or more projections, a cavity, one or more channels, a port, an adhesive, or any combination thereof.

The connector devices may comprise one or more materials. The materials may include a metal, a polymer, or both. The metal may include aluminum, magnesium, titanium, steel, or any combination thereof. The polymer may be a thermoset or a thermoplastic. The polymer may include polyamide, polyester, polypropylene, polyethylene, polysulfone, thermoplastic imide, polyether imide, polyether sulfone, or any combination thereof. The polyamide may include nylon 6, nylon 6,6, or both. A non-limiting example of a suitable polyamide may include Ultramid® D3WG12 HMG, commercially available from BASF Corporation.

The polymer may include a reinforcement material. The reinforcement material may include fiber reinforcement, mineral reinforcement, or both. The fiber reinforcement may include glass fibers, polyamide fibers (e.g., Kevlar®), carbon fibers, ceramic fibers, nylon fibers, the like, or any combination thereof. The mineral reinforcement may include wollastonite, pyrophyllite, sauconite, saponite, nontronite, montmorillonite, silica, calcium, diatomaceous earth, clay, the like, or any combination thereof. A non-limiting example of a suitable fiber reinforcement may include 366 Type 30® Single End Roving, commercially available from Owens Corning.

The connector devices may comprise a base member. The base member may function to secure the brackets to a frame and/or structure.

The base member may include one or more sides. The base member may include a first side and a second side opposing the first side.

The base member may include one or more ribs. The ribs may function to increase the structural support of the base member. The ribs may extend within the base plate. The ribs may extend within the base plate longitudinally, transversely, peripherally, or at any angle therebetween. The ribs may be located on a side of the base member opposing a side from which a projection extends. The ribs may be located on a second side of the base member.

The base member may include one or more through-holes. The through-holes may function to receive fasteners to secure the brackets to a frame and/or structure. The through-holes may extend between opposing sides of the base member. The through-holes may be located anywhere on the base member.

The base member may be generally planar. The base member may have a thickness of about 0.5 mm or more, 1 mm or more, or even 1.5 mm or more. The base member may have a thickness of about 3 mm or less, 2.5 mm or less, or even 2 mm or less.

The base member may be integrally interconnected with one or more projections.

The base member may include one or more ports extending between opposing sides of the base member.

The base member may include one or more end channels.

The brackets may comprise one or more projections. The projections may function to couple with members (e.g., steps).

The projections may extend a length from the base member. Where more than one projection is employed, the projections may extend at different lengths from the base member. The projections may extend generally perpendicular to the base member.

The projections may comprise a shaped profile as viewed along a longitudinal axis of the projections. The shaped profile may be circular, ovoid, square, rectangular, truncated circular, the like, or any combination thereof, although other shapes are contemplated by the present disclosure. The shaped profile may be generally the same as the shaped profile of the members.

The projections may comprise one or more voids extending along a length of a perimeter of the one or more projections. The voids may be a break or interruption in material defining the projections.

The projections may be hollow or solid. The projections may each define a cavity. The cavity may function to receive a member (e.g., step) therein. A hollow projection may comprise a wall of material. The wall of the projections may have a thickness of about 0.5 mm or more, 1 mm or more, or even 1.5 mm or more. The wall of the projections may have a thickness of about 3 mm or less, 2.5 mm or less, or even 2 mm or less.

One or more channels may be located on and/or proximate to the projections. The one or more projections may include one or more peripheral channels.

The projections may include two or more projections that may be coaxial to each other. The projections may act as a female connector or a male connector. A female connector may receive one or more members within a cavity defined by the projections. A male connector may receive one or more members over an outer perimeter of the projections.

The connector devices may comprise one or more channels. The channels may function to allow and guide an adhesive to flow therethrough.

Two or more channels may be interconnected. Two or more channels may be in fluid communication with one another.

The channels may be located on the base member, projections, or both.

The channels may include one or more end channels, peripheral channels, or both. The end channel may be located on the base member. The end channel may be configured to at least partially receive and/or be situated proximate to an end of the members. The end channel may extend around a perimeter of the projections or at least a portion thereof. The end channel may extend around an inner and/or outer perimeter of the projections. The peripheral channel or at least a portion thereof may extend from a first side of the base member along a projection toward an end of the projection distanced from the base member. The peripheral channel may extend along the length of the perimeter of the projection or at least a portion thereof. The peripheral channel may be located on an inner and/or outer perimeter of the projections. The inner perimeter, as referred to herein, may mean the perimetric surface situated within a cavity. The outer perimeter, as referred to herein, may mean the perimetric surface situated outside of the cavity. The peripheral channel may be configured to situate proximal to a periphery of the members. The end channels and the peripheral channels may be in fluid communication with one another.

The channels may be defined by a space between two adjacent projections. For instance, between two co-axial projections where one projection is disposed within the other. The channels may be defined by grooves formed in the base members, projections, or both. The channels may retain an adhesive. The channels may guide the flow of an adhesive. The channels and members may encapsulate an adhesive therebetween.

The connector devices may comprise one or more ports. The ports may function to provide a path of ingress and/or egress for the adhesive into and/or from the channels. Adhesive may be provided in sufficient amount to a port to fill a volume of a channel. An egress port may be provided in case there is spillover from a channel.

The connector devices may extend from a first side of the base member to a second side of the base member. The ports may be in fluid communication with the channels. The ports may be in fluid communication with end channels, peripheral channels, or both. The ports may provide for the ingress of an adhesive before and/or after the brackets and members (e.g., steps) have been connected.

The connector devices may comprise an adhesive. The adhesive may function to adhere the connector devices to the members. The adhesive may be a two-part composition comprising an A-side (i.e., "first component") and a B-side (i.e., "second component"). Upon mixing, the two-part composition may form a curable composition. The reaction product, when fully cured, may be an elastomeric material. The elastomeric material may be utilized as a gasket or sealing material.

The A-side may comprise one or more epoxy resins, one or more additives, one or more monomers, or any combination thereof.

The epoxy resins may include one or more liquid epoxy resins, one or more flexible epoxy resins, one or more epoxy phenol novolac resins, one or more aliphatic multifunctional epoxy resins, one or more reactive diluents, one or more silane modified epoxy resins, one or more monomers, or any combination thereof.

The additives may include one or more toughening agents (e.g., core-shell polymeric particles), metal carbonate, minerals, reinforcing fiber, hydrophobic silica, tabular alumina, or any combination thereof.

The B-side may comprise one or more phosphate esters, phosphoric acid, one or more additives, one or more monomers, or any combination thereof.

The phosphate esters may include a first phosphate ester, a second phosphate ester, a third phosphate ester, or any combination thereof.

The additives may include, minerals, reinforcing fiber, hydrophobic silica, or any combination thereof.

The phosphate esters may be one or more customized phosphate esters. The one or more customized phosphate esters may be produced by the reaction of phosphoric acid and various alcohols. The customized phosphate esters may be produced by the reaction of phosphoric acid and an epoxide group of a phosphate ester precursor. Phosphate ester precursor, as referred to herein, may mean a component not yet reacted with phosphoric acid. The customized phosphate esters may be produced by the reaction of phosphoric acid with the glycidyl ether of cashew nutshell liquid (CNSL). A non-limiting example of a suitable cashew nutshell liquid may include Cardolite® LITE 2513HP, commercially available from Cardolite Corporation, Monmouth Junction NJ. The customized phosphate esters may be produced by the reaction of phosphoric acid with a phenyl glycidyl ether. A non-limiting example of a suitable phenyl glycidyl ether may include ERISYS® GE-13, commercially available from CVC Thermoset Specialties, Moorestown, NJ. The customized phosphate esters may be produced by the reaction of phosphoric acid with 2-ethylhexyl glycidyl ether. A non-limiting example of a suitable 2-ethylhexyl glycidyl ether may include ERISYS® GE-6, commercially available from CVC Thermoset Specialties, Moorestown, NJ. The customized phosphate esters may be produced by the reaction of phosphoric acid with an epoxidized para-tertiary butyl phenol. A non-limiting example of a suitable epoxidized para-tertiary butyl phenol may include ERISYS® GE-11, commercially available from CVC Thermoset Specialties, Moorestown, NJ. The customized phosphate esters may be reacted with a mono-functional epoxy. The customized phosphate esters can be the reaction product of phosphoric acid and a mono-epoxide functional molecule in general.

The phosphate esters may be commercially pre-reacted phosphate esters. The commercially pre-reacted phosphate esters, when swapped into the B-side in place of a customized phosphate ester may result in a curable composition that is slower reacting and foaming presumably due to a lower level of free phosphoric acid and therefore higher pH of the B-side. Reacting and foaming of the commercially pre-reacted phosphate esters may be improved, that is the reaction speed may be increased, by the addition of phosphoric acid in the B-side. The commercially pre-reacted phosphate esters may have a pH of from about 1 to about 3 in aqueous solution. The commercially pre-reacted phosphate esters may have a viscosity of about 10,000 cP or more, 15,000 cP or more, or even 20,000 cP or more at 25° C. as measured according to ASTM D445-21. The commercially pre-reacted phosphate esters may have a viscosity of about 42,500 cP or less, 35,000 cP or less, or even 30,000 cP or less at 25° C. as measured according to ASTM D445-21. The commercially pre-reacted phosphate esters may be a nonyl phenol ethoxylated phosphate ester. Non-limiting examples of suitable commercially pre-reacted phosphate esters may include those sold under the trade names Dextrol™ OC-110, Dextrol OC-40, and Strodex MO-100 commercially available from Ashland, Inc., Covington, KY.

The commercially pre-reacted phosphate esters may be present in the B-side. The commercially pre-reacted phosphate esters may be present in an amount of about 0.1% or more, 5% or more, 10% or more, 15% or more, 20% or more, or even 25% or more, by weight of the B-side. The commercially pre-reacted phosphate esters may be present in an amount of about 50% or less, 45% or less, 40% or less, 35% or less, or even 30% or less, by weight of the B-side.

The phosphate esters may be produced by a reaction of a range of stoichiometric ratios of phosphate ester precursors to phosphoric acid. The phosphate esters may be produced by a reaction of between about 0.7:1 and 1:0.7, more preferably between about 0.8:1 and 1:0.8, more preferably between about 0.9:1 and 1:0.9, or even more preferably about 1:1 phosphate ester precursor to phosphoric acid.

The cashew nutshell liquid (CNSL) may include chemicals commonly extracted from cashew nutshell liquid (CNSL) including anacardic acids, cardol, cardanol, or any combination thereof. Preferably, the glycidyl ether of the cashew nutshell liquid (CNSL) is a glycidyl ether of cardanol.

The phosphate esters may be selected from mono-esters, di-esters, or tri-esters as shown below.

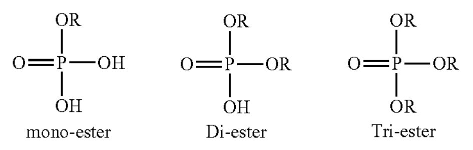

mono-ester Di-ester Tri-ester

The phosphate esters may be obtained from the reaction of epoxide groups with phosphoric acid as depicted below.

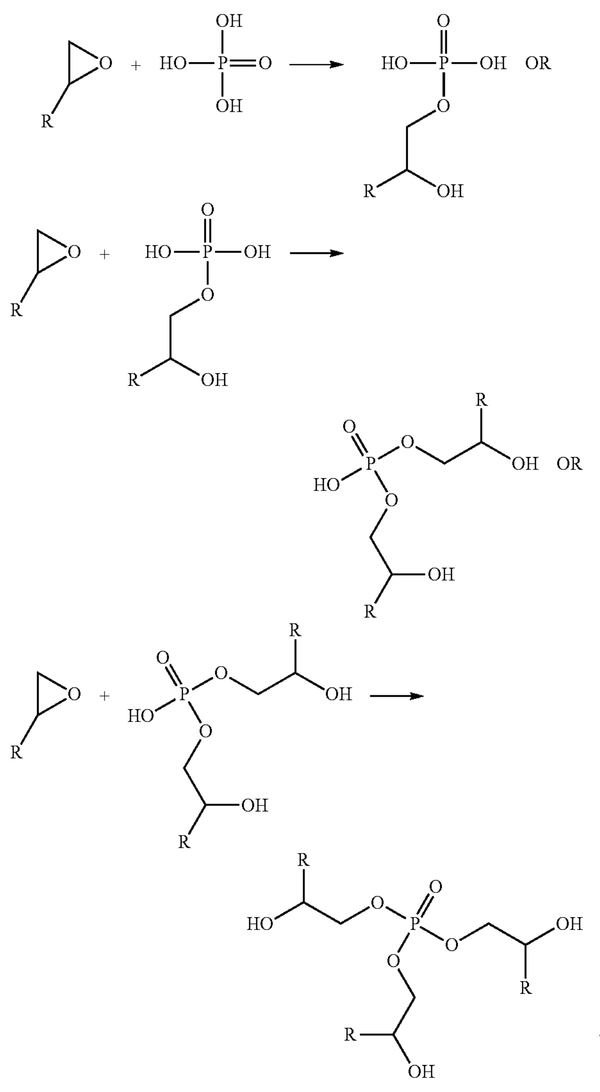

The B-side may comprise one or more phosphate esters, one or more phosphate ester precursors, or both. The B-side may comprise phosphate ester precursors that may be combined with phosphoric acid prior to combination with the A-side. The B-side may comprise phosphate esters that are pre-reacted, that is pre-reacted to epoxide groups, before addition to the B-side.

The first phosphate ester may be the reaction product of phosphoric acid with the glycidyl ether of cashew nutshell liquid (CNSL) (e.g., Cardolite® LITE 2513HP). The second phosphate ester may be the reaction product of a stoichiometric amount of about 1:1 2-ethylhexyl glycidyl (e.g., ERISYS® GE-6) to phosphoric acid. The third phosphate ester may be the reaction product of a stoichiometric amount of 0.8:1 phosphoric acid with 2-ethylhexyl glycidyl ether (e.g., ERISYS® GE-6). However, there are numerous possibilities for the first, second, or third phosphate ester.

The first phosphate ester may be present in an amount from about 10% to about 60%, more preferably about 25% to about 35%, or even more preferably about 28% to about 32%, by weight of the B-side.

The second phosphate ester may be present in an amount from about 5% to about 40%, more preferably about 15% to about 25%, or even more preferably about 18% to about 22%, by weight of the B-side.

The third phosphate ester may be present in an amount from about 10% to about 65%, more preferably about 35% to about 60%, or even more preferably about 42% to about 58%, by weight of the B-side.

The B-side may include phosphoric acid. The phosphoric acid may be ortho-phosphoric acid, polyphosphoric acid, or both. The phosphoric acid may be present as free acid in the phosphate esters, added independently from the phosphate esters, or both. The addition of phosphoric acid to the B-side may result in increased expansion (e.g., foaming) of the resulting reaction product. The addition of phosphoric acid to the B-side may increase the reactivity of the two-part system to help maintain desired levels of expansion, curing, or both when temperatures are below 23° C.

The independently added phosphoric acid may be in aqueous solution in the amount of 85% or more (i.e., "reagent grade"). The independently added phosphoric acid may be present in an amount of from about 1% to about 20%, more preferably about 2% to about 6%, or even more preferably about 4% by weight of the B-side.

The phosphate esters, produced from the reaction of phosphoric acid and phosphate ester precursor, may include free acid. The phosphate esters may have about 1% or more, about 3% or more, or even about 5% or more of free acid. The phosphate esters may have about 15% or less, about 13% or less, or even about 11% or less of free acid.

The two-part system, upon addition of the A-side and the B-side together, may foam as a result of a reaction of metal carbonate or metal bicarbonate and an acid. The reaction of metal carbonate or metal bicarbonate and acid may generate a release of gas. The gas may include carbon dioxide. Blowing agents that foam as a result of a byproduct to a chemical reaction are typically termed as chemical blowing agents. Such a reaction mechanism is described in U.S. Pat. No. 5,648,401, incorporated by reference herein in its entirety for all purposes.

The reacting, foaming, or both may occur at a temperature of about 50° C. or less, about 40° C. or less, or even about 30° C. or less. The reacting, foaming, or both may occur at a temperature of about 0° C. or more, about 10° C. or more, or even about 20° C. or more. The curing, foaming, or both may occur at room temperature. Room temperature, as referred to herein, may mean a temperature of about 15° C. to about 25° C.

The present teachings contemplate a relatively fast curing time, foaming time, or both as compared to other cure agents or cure systems that occur without the addition of a stimulus (e.g., at room temperature). The cure time of the reaction product may be about 75 minutes or less, 50 minutes or less, 30 minutes or less, or even 20 minutes or less. The cure time of the reaction product may be about 2 minutes or more, 8 minutes or more, or even 16 minutes or more.

Foaming may begin before complete reaction of the resulting reaction product. The foaming time (i.e., the time frame within which the two-part system actively foams) of the reaction product may be about 30 minutes or less, or even 20 minutes or less. The foaming time of the reaction product may be about 1 minute or more, 5 minutes or more, or even 10 minutes or more.

The A-side may include one or more epoxide-functional materials. The epoxide functional material may be an epoxy resin. The epoxy resins may be any conventional dimeric, oligomeric, or polymeric epoxy resin. The epoxy resins may contain at least one epoxide functional group (i.e., monofunctional) or may contain more than one epoxide functional group (i.e., multifunctional). The epoxy resins may contain one or more epoxide functional groups, two or more epoxide functional groups, three or more epoxide functional groups, or even four or more epoxide functional groups. The epoxy resins may be modified epoxy resins (e.g., silane modified, elastomer modified, and the like). The epoxy resins may be aliphatic, cycloaliphatic, aromatic, the like, or any combination thereof. The epoxy resins may be supplied as a solid (e.g., as pellets, chunks, pieces, or the like, or any combination thereof) or a liquid (e.g., a liquid epoxy resin). If solid resins are used, it is possible that they would first be dissolved in a liquid resin or other suitable solvent. As used herein, unless otherwise stated, an epoxy resin is a solid if it is solid at a temperature of about 23° C. and is a liquid resin if it a liquid at a temperature of about 23° C. The epoxy resins may include liquid epoxy resins, flexible epoxy resins, epoxy phenol novolac resins, aliphatic multifunctional epoxy resins, reactive diluents, silane modified epoxy resins, or any combination thereof.

The two-part system may include one or more liquid epoxy resins. The liquid epoxy resins may function as a base for the epoxy resin component. The liquid epoxy resins may be a reaction product of epichlorohydrin ("EPH") and any conventional bisphenol. The liquid epoxy resins may be a reaction product of EPH and bisphenol A ("BPA"), bisphenol F ("BPF"), or both.

The liquid epoxy resins (which may be standard or commodity liquid epoxy resins) may have an epoxide equivalent weight ("EEW") of about 100 g/equivalent or more, 200 g/equivalent or more, 300 g/equivalent or more, or even 400 g/equivalent or more, as measured according to ASTM D1652-97. The liquid epoxy resins may have an epoxide equivalent weight of about 1000 g/equivalent or less, 900 g/equivalent or less, 800 g/equivalent or less, or even 700 g/equivalent or less, as measured according to ASTM D1652-97. The liquid epoxy resins may have an epoxide percentage from about 20 to about 25. The liquid epoxy resins may have a viscosity of about 10 cP or more, 50 cP or more, 100 cP or more, or even 500 cP or more, at 25° C. as measured according to ASTM D445-21. The liquid epoxy resins may have a viscosity of about 100,000 cP or less, 10,000 cP or less, or even 1,000 cP or less, at 25° C. as measured according to ASTM D445-21. A non-limiting example of a suitable BPA-based liquid epoxy resin may include D.E.R.™ 331, commercially available from The Olin Corporation, Clayton, MO. A non-limiting example of a suitable BPF-based liquid epoxy resin may include YDF-170, commercially available from Kukdo Chemical, South Korea.

The liquid epoxy resins may be present as a part of the A-side. The liquid epoxy resins may be present in an amount of about 4% or more, 10% or more, 15% or more, or even 20% or more, by weight of the A-side. The liquid epoxy resins may be present in an amount of about 50% or less, 40% or less, or even 30% or less, by weight of the A-side.

The two-part system may include one or more flexible epoxy resins. The flexible epoxy resins may function to reduce the elastic modulus, increase strain to failure, decrease time to recover, decrease the degree of cross-linking density in the reaction product, increase impact resistance, improve adhesion, improve peel resistance, or any combination thereof, of the reaction product. The flexible epoxy resins may improve the gas entrapment capability of the two-part system in part by acting as a viscosity modifier or reducing gas permeability.

The flexible epoxy resin may be a di-functional glycidyl ether epoxy resin, an unmodified BPA-based epoxy resin, a multifunctional epoxidized polybutadiene resin, or any combination thereof. The flexible epoxy resins may have an EEW of about 260 g/equivalent or more, 300 g/equivalent or more, or even 350 g/equivalent or more, as measured according to ASTM D1652-97. The flexible epoxy resins may have an EEW of about 500 g/equivalent or less, 450 g/equivalent or less or even 400 g/equivalent or less, as measured according to ASTM D1652-97. The flexible epoxy resins may have a viscosity of about 700 cP or more, 1,000 cP or more, or even 10,000 cP or more, at 25° C. as measured according to ASTM D445-21. The flexible epoxy resins may have a viscosity of about 500,000 cP or less, 100,000 or less, or even 50,000 or less, at 25° C. as measured according to ASTM D445-21. Non-limiting examples of suitable flexible epoxy resins may include NC-514, commercially available from Cardolite Corporation, Monmouth Junction NJ; Araldite® PY 4122, commercially available from Huntsman Advanced Materials, Inc., Salt Lake City, UT; and Poly Bd® 605E, commercially available from Cray Valley, Exton, PA; or any combination thereof.

The flexible epoxy resins may be present in the A-side. The flexible epoxy resins may be present in an amount of about 10% or more, 15% or more, 20% or more, or even 25% or more, by weight of the A-side. The flexible epoxy resins may be present in an amount of about 50% or less, 45% or less, 40% or less, or even 35% or less, by weight of the A-side.

The flexible epoxy resins may include a di-functional glycidyl ether epoxy resin in the amount of from about 10% to about 18% (e.g., 14%), by weight of the A-side. The flexible epoxy resins may include an unmodified BPA-based epoxy resin in an amount from about 8% to about 16% (e.g., 12%), by weight of the A-side. The flexible epoxy resins may include a multifunctional epoxidized polybutadiene resin in an amount from about 8% to about 16% (e.g., 12%), by weight of the A-side. The two-component system may include a di-functional glycidyl ether epoxy resin, a difunctional epoxy derived from cardanol, and a multifunctional epoxidized polybutadiene resin, respectfully in a ratio of about 1:1:1 to about 1:0.8:0.8 (e.g., about 1:0.9:0.9).

The two-part system described herein may include one or more epoxy phenol novolac resins. The epoxy phenol novolac resins may function to impart chemical resistance, solvent resistance, temperature resistance, or any combination thereof, to the reaction product. The epoxy phenol novolac resins may be present as a part of the A-side.

The epoxy phenol novolac resins may have an EEW from about 165 g/equivalent to about 183 g/equivalent, as measured according to ASTM D1652-97. The epoxy phenol novolac resins may have an average epoxy functionality from about 2.1 to about 6.5. One of the primary functions of the epoxy phenol novolac resins is to increase network crosslink density via multifunctionality. This is also important to control reaction speed and the ability to prevent foam collapse (i.e., collapse of foam structure) during and/or after the reaction process. The epoxy phenol novolac resins may have a viscosity of about 18,000 cP or more, 20,000 cP or more, or even 22,000 cP or more, at 25° C. as measured according to ASTM D445-21. The epoxy phenol novolac resins may have a viscosity of about 30,000 cP or less, 28,000 cP or less, or even 26,000 cP or less, at 25° C. as measured according to ASTM D445-21. Non-limiting examples of suitable epoxy phenol novolac resins may include those sold under the trade names Epalloy 8250 and Epalloy 8330, commercially available from CVC Thermoset Specialties, Moorestown, NJ.

The epoxy phenol novolac resins may be present in an amount of about 30% or more, 35% or more, or even 40% or more, by weight of the A-side. The epoxy phenol novolac resins may be present in an amount of about 50% or less, or even 45% or less, by weight of the A-side. The epoxy phenol novolac resins may have a functionality of about 3.6. The about 3.6 functional epoxy phenol novolac resin may be present in an amount of about 2% or more, 4% or more, 6% or more, or even 8% or more, by weight of the A-side. The about 3.6 functional epoxy phenol novolac resin may be present in an amount of about 18% or less, 16% or less, 14% or less, or even 12% or less, by weight of the A-side. The epoxy phenol novolac resins may have a functionality of about 6.5. The about 6.5 functional epoxy novolac resin may be present in an amount of about 22% or more, 24% or more, or even 26% or more, by weight of the A-side. The about 6.5 functional epoxy novolac resin may be present in an amount of about 32% or less, 30% or less, or even 28% or less, by weight of the A-side. The two-part system may include an about 3.6 functional epoxy phenol novolac resin and an about 6.5 functional epoxy phenol novolac resin at a ratio of about 1:2 to about 1:3.

The two-part system may include one or more aliphatic multifunctional epoxy resins. The aliphatic multifunctional epoxy resins may function to increase the degree of cross-linking of the reaction product, increase the chemical resistance of the reaction product, or both. These resins may have the ability to increase the crosslink density of the resultant reaction product while preserving or enhancing the elastomeric nature of the reaction product. In general, multifunctional materials will make the reaction product less elastomeric.

The aliphatic multifunctional epoxy resins may include an epoxidized sorbitol. The aliphatic multifunctional epoxy resins may have an EEW from about 160 g/equivalent to about 195 g/equivalent, as measured according to ASTM D1652-97. The aliphatic multifunctional epoxy resins may have a viscosity of about 4,000 cP or more, 6,000 cP or more, or even 8,000 cP or more, at 25° C. as measured according to ASTM D445-21. The aliphatic multifunctional epoxy resins may have a viscosity of about 18,000 cP or less, 16,000 cP or less, or even 14,000 cP or less, at 25° C. as measured according to ASTM D445-21. Non-limiting examples of suitable aliphatic multifunctional epoxy resins may include those sold under the trade names ERISYS® GE-60 and ERISYS® GE-61, commercially available from CVC Thermoset Specialties, Moorestown, NJ.

The aliphatic multifunctional epoxy resins may be present as a part of the A-side. The aliphatic multifunctional epoxy resins may be present in an amount of about 5% or more, 8% or more, or even 11% or more, by weight of the A-side. The aliphatic multifunctional epoxy resins may be present in an amount of about 20% or less, 17% or less, or even 14% or less, by weight of the A-side.

The two-part system may include one or more reactive diluents. The reactive diluents may function to reduce the overall viscosity of the two-part system, decrease the degree of cross-linking of the reaction product when monofunctional, or both. Reduction in the overall viscosity may modify the dispensing process or the flow of the two-part system on a workpiece after dispensing. When statistically more than difunctional, the diluent may increase crosslink density. The reactive diluents may be polymeric. The polymeric reactive diluent may increase the flexibility of the reaction product. The reactive diluents may be multifunctional. The multifunctional reactive diluent may promote increased crosslinking and impart chemical resistance on the reaction product.

The reactive diluents may include a polyglycol diglycidyl ether, a trimethylolethane triglycidyl either, or both. The reactive diluents may have an EEW from about 100 g/equivalent to about 300 g/equivalent, as measured according to ASTM D1652-97. The reactive diluents may have a viscosity of about 10 cP or more, 50 cP or more, or even 100 cP or more, at 25° C. as measured according to ASTM D445-21. The reactive diluents may have a viscosity of about 1,000 cP or less, 800 cP or less, or even 600 cP or less, at 25° C. as measured according to ASTM D445-21. Non-limiting examples of suitable reactive diluents may be those sold under the trade names ERISYS® GE-31 and ERISYS® GE-24, commercially available from CVC Thermoset Specialties, Moorestown, NJ.

The reactive diluents may be present in the A-side. The reactive diluents may be present in an amount of about 5% or more, 8% or more, or even 11% or more, by weight of the A-side. The reactive diluents may be present in an amount of about 20% or less, 17% or less, or even 14% or less, by weight of the A-side. The reactive diluents may include a polyglycol diglycidyl ether present in an amount from about 2% to about 6% (e.g., 4%), by weight of the A-side. The reactive diluents may include a trimethylolethane triglycidyl ether present in an amount from about 6% to about 14% (e.g., 9%), by weight of the A-side. The two-part system may include a polyglycol diglycidyl ether and a trimethylolethane triglycidyl ether respectively at a ratio of about 1:2 to about 1:3.

The two-part system may include one or more silane modified epoxy resins. The silane modified epoxy resins may function to impart improved adhesion to the reaction product, particularly adhesion to glass, metals, or both. A non-limiting example of a suitable silane modified epoxy resin may be that sold under the trade name EPOKUKDO® KSR-177, commercially available from Kukdo Chemical, South Korea. Another non-limiting example of a suitable silane modified epoxy resin may be a silicone pre-polymer with cycloaliphatic epoxide groups. An example of a suitable silicone pre-polymer with cycloaliphatic epoxide groups is available under the trade name Silmer EPC Di-50, available from Siltech Corporation, Ontario, Canada.

The silane modified epoxy resins may be present in the A-side. The silane modified epoxy resins may be present in an amount of about 1% or more, 4% or more, or even 7% or more, by weight of the A-side. The silane modified epoxy resins may be present in an amount of about 15% or less, 11% or less, or even 8% or less, by weight of the A-side.

The two-part system may include one or more monomers. The monomers may function to improve adhesion properties of the reaction product, particularly to metal substrates, increase flexibility of the reaction product, increase impact resistance of the reaction product, or any combination thereof. The monomers may be monofunctional, difunctional, or even polyfunctional. The monomers may be an esterification reaction product of an alcohol and acrylic acid or methacrylic acid. The monomers may be a monofunctional acrylic monomer. Preferably, the monomers may be a mixture of methacrylate acid ester and 2-(2-ethoxyethoxy) ethyl acrylate. A non-limiting example of a suitable monomer may be that sold under the trade name SR 9050, commercially available from Sartomer, Exton, PA.

The two-part system may include monomers in the A-side, the B-side, or both. The monomers may be present in an amount of about 0.1% or more, 1% or more, 5% or more, or even 10% or more, by weight of the A-side, B-side, or both the A-side and B-side in combination. The monomers may be present in an amount of about 26% or less, 20% or less, or even 15% or less, by weight of the A-side, B-side, or both the A-side and B-side in combination.

The rate of cure, the degree of crosslinking, or both may be a function of the functionality of the two-part system (A-side and B-side). Functionality may refer to the average number of functional groups on the polymerizable components. A higher functionality may be desired for a two-part system having pre-polymerized components that are shorter in polymer length (i.e., typically resulting in lower viscosity). The lack of structural backbone resulting from shorter polymers may be compensated by a higher degree of crosslinking. A lower functionality may be desired for a two-part system having pre-polymerized components that are longer in length (i.e., typically resulting in higher viscosity). The presence of more structural backbone resulting from longer polymers may preclude the need for high functionality.

The B-side functionality may at least partially be reduced by the reaction of metal carbonate in the A-side with phosphoric acid and the phosphate esters and as a result, the functionality of the B-side may be reduced. The A-side may include components with increased functionality in order to compensate for a reduced functionality of the B-side. The A-side may be formulated with increased functionality by using reactive ingredients with functionality higher than two.

The two-part system may include one or more additives. The additives may include one or more toughening agents, calcium carbonates, minerals, reinforcing fibers, hydrophobic silicas, tabular aluminas, or any combination thereof.

The two-part system may include one or more toughening agents. The toughening agents may function to distribute energy within the reaction product (i.e., increase impact resistance). The toughening agents may contribute to an increased T-Peel strength. The toughening agents may comprise thermoplastics, thermosets or thermosettables, elastomers, the like, or any combination thereof. The toughening agents may include elastomers, core-shell polymers, or both.

The core-shell polymers may comprise a first polymeric material (i.e., core material) and a second polymeric material (i.e., shell material). The first polymeric material may be entirely encapsulated by the second polymeric material. The core-shell polymer may include a first polymeric material in the amount of about 30% or more, 50% or more, or even 70% or more, by weight. The first polymeric material, the second polymeric material, or both may comprise one, two, three, or even more than three polymers that are combined together, reacted together (e.g., sequentially polymerized), or both, or may be part of separate or the same core-shell polymer systems. Non-limiting examples of suitable core-shell polymers may include those sold under the trade names Kane Ace™ MX-267 and MX-257, both commercially available from Kaneka North America LLC, Pasadena, TX.

The core-shell polymers may be present in an amount of about 1% or more, 5% or more, or even 10% or more, by weight of the A-side, B-side, or both the A-side and B-side in combination. The core-shell polymers may be present in an amount of about 25% or less, 20% or less, or even 15% or less, by weight of the A-side, B-side, or both the A-side and B-side in combination.

The two-part system may include one or more metal carbonates. The metal carbonates may function to produce gas in the presence of an acid, act as a filler, control the onset or total extent of the foaming (e.g., expansion) process, or both. The metal carbonates may be a metal carbonate or metal bicarbonate. Examples of suitable fillers may include calcium carbonate, nickel carbonate, barium carbonate, sodium bicarbonate, and potassium bicarbonate. Preferably, the metal carbonates may include calcium carbonate. The particle size of the metal carbonate, metal bicarbonate, or both may control the expansion and cure of the two-part system. The total surface area of metal carbonate, metal bicarbonate, or both, available to react with the acid is a function of both the particle size of the metal carbonate, bicarbonate, or both, and the amount present in the two-part system.

The calcium carbonate may be present as one or more calcium carbonate fillers. The calcium carbonate fillers may have a median particle size of from about 1 microns to about 50 microns. The calcium carbonate may have a medium fine particle size. For example, the median particle size of the medium fine calcium carbonate may be about 22 microns. A non-limiting example of a suitable medium fine calcium carbonate may include Hubercarb® Q200, commercially available from Huber Engineered Materials, Atlanta, GA. The calcium carbonate may have a fine particle size. For example, the median particle size of the fine calcium carbonate may be about 4 microns. A non-limiting example of a suitable fine calcium carbonate may include Hubercarb® Q4, commercially available from Huber Engineered Materials, Atlanta, GA. The calcium carbonate may have an ultra-fine particle size. For example, the median particle size of the ultra-fine calcium carbonate may be about 1 micron. A non-limiting example of a suitable ultra-fine calcium carbonate may include Hubercarb® Q2, commercially available from Huber Engineered Materials, Atlanta, GA. The two-part system may include medium fine calcium carbonate, fine calcium carbonate, ultra-fine calcium carbonate, or any combination thereof.

The calcium carbonate may be present in an amount of about 1% or more, 5% or more, or even 10% or more, by weight of the A-side. The calcium carbonate may be present in an amount of about 25% or less, 20% or less, or even 15% or less, by weight of the A-side.

The calcium carbonate may include both a fine calcium carbonate present in an amount from about 4% to about 8%, by weight of the A-side, and a medium fine calcium carbonate present in an amount from about 13% to about 18%, by weight of the A-side. The calcium carbonate may include both a fine calcium carbonate present in an amount of about 6%, by weight of the A-side, and a medium fine calcium carbonate present in an amount of about 15%, by weight of the A-side. The calcium carbonate may include both a fine calcium carbonate present in an amount of about 5%, by weight of the A-side, and a medium fine calcium carbonate present in an amount of about 5%, by weight of the A-side. The ratio of a medium fine calcium carbonate to a fine calcium carbonate may be about 3:1 to about 1:3 (e.g., about 1:1).

The calcium carbonate may include a coating. The coating may be any material that breaks down during the activation process, expansion process, or both, so that expansion is delayed, slowed, or both. The coating may be a wax, a fatty acid, or both.

The two-part system may include one or more minerals. The minerals ("mineral reinforcement") may function to structurally reinforce the reaction product. The minerals may improve the tensile strength, flexural strength, or both of the reaction product. The minerals may include any suitable silicate minerals including but not limited to inosilicates (e.g., Wollastonite) and phyllosilicates (e.g., Kaolinite, Vermiculite, Talc, Muscovite, or any combination thereof). The characteristic external shape of an individual crystal or crystal group of the minerals may be acicular or needle-like. The median particle size of the minerals may be from about 10 microns to about 20 microns, more preferably from about 12 microns to about 18 microns.

The minerals may include Wollastonite. The Wollastonite may be relatively pure (i.e., less than 2% by weight of impurities such as other metal oxides). The Wollastonite may contain impurities including one or more oxides of iron, magnesium, manganese, aluminum, potassium, sodium, or strontium substituting for calcium in the mineral structure. Non-limiting examples of suitable Wollastonite may include those sold under the trade names NYGLOS® 12 and NYGLOS® 8, commercially available from NYCO Minerals Inc., Willsboro, NY.

The minerals may be present as part of the A-side, the B-side, or both. The minerals may be present in an amount of about 0.1% or more, 1% or more, or even 3% or more, by weight of the A-side, B-side, or both the A-side and B-side in combination. The minerals may be present in an amount of about 10% or less, 8% or less, or even 6% or less, by weight of the A-side, B-side, or both the A-side and B-side in combination.

Where Wollastonite is employed, it may be present in an amount of about 0.1% or more, 1% or more, or even 3% or more, by weight of the A-side, B-side, or both the A-side and B-side in combination. The Wollastonite may be present in an amount of about 10% or less, 8% or less, or even 6% or less, by weight of the A-side, B-side, or both the A-side and B-side in combination.

Where calcined kaolin clay is employed, it may be present as a part of the A-side. The calcined kaolin clay may be present in an amount of about 0.1% or more, or even 1% or more, by weight of the A-side. The calcined kaolin clay may be present in an amount of about 5% or less, or even 4% or less, by weight of the A-side.

The two-part system may include one or more reinforcing fibers. The reinforcing fibers may function to structurally reinforce the reaction product. The reinforcing fibers may improve tensile strength, flexural strength, or both of the reaction product. The reinforcing fibers may be present in the A-side, the B-side, or both. The reinforcing fibers may be dispersed homogenously within the A-side, the B-side, or both.

The reinforcing fibers may comprise polymeric fibers, glass fibers (i.e., fiberglass), or both. The polymeric fibers may include nylon, polyamide, polyester, polypropylene, polyethylene, polytetrafluoroethylene, aramid fibers (e.g., Kevlar®), the like, or any combination thereof. The glass fibers may include alumino-borosilicate glass ("E-glass"), alkali-lime glass ("A-glass" or "C-glass"), electrical/chemical resistance glass ("E-CR-glass"), borosilicate glass ("D-glass"), alumino-silicate glass ("R-glass" or "S-glass"), or any combination thereof.

The reinforcing fiber may be chopped fiber. The reinforcing fiber may be a chopped length of about 0.1 cm or more, about 0.3 cm or more, or even about 0.6 cm or more. The reinforcing fiber may be a chopped length of about 2.0 cm or less, about 1.5 cm or less, or even about 1.0 cm or less. Non-limiting examples of suitable fiberglass may include chopped strands commercially available from Jushi USA, Columbia, SC.

The reinforcing fiber may be present in the amount of about 0.01% or more, or even 0.1% or more, by weight of the A-side, B-side, or both the A-side and B-side in combination. The reinforcing fiber may be present in the amount of about 3% or less, or even 2% or less, by weight of the A-side, B-side, or both the A-side and B-side in combination.

The two-part system may include one or more thixotropes to control viscosity.

The two-part system may include hydrophobic silica. The hydrophobic silica may function to control viscosity (e.g., thicken), control thixotropy, boost hydrophobia, or a combination thereof. The hydrophobic silica may include fumed silica. The hydrophobic silica may be surface treated. For example, the hydrophobic silica may include fumed silica surface-treated with polydimethylsiloxane ("PDMS") or hexamethyldisilazane ("HMDZ"). The hydrophobic silica may be present as part of the A-side, the B-side, or both. Non-limiting examples of suitable hydrophobic silica may include those sold under the trade name AEROSIL® R 202, commercially available from Evonik Corporation, Parsippany, NJ; and CAB-O-SIL® TS-530 and TS-720, commercially available from Cabot Corporation, Boston, MA.

The hydrophobic silica may be present in an amount of about 0.25% or more, 0.5% or more, or even 1% or more, by weight of the A-side, B-side, or both the A-side and B-side in combination. The hydrophobic silica may be present in an amount of about 6% or less, 4% or less, or even 2%, by weight of the A-side, B-side, or both the A-side and B-side in combination. The ratio of hydrophobic silica in the A-side to the B-side may be from about 1:6 to about 6:1, from about 1:4 to about 4:1, or even about 1:2 to about 2:1.

The two-part system may include tabular alumina. The tabular alumina may function to impart hardness, resistance to thermal shock, resistance to mechanical shock, high heat capacity, high electrical resistance, or any combination thereof, to the reaction product. The tabular alumina may be present in the A-side, the B-side, or both. The tabular alumina may be alpha alumina converted to its corundum form (i.e., crystalline aluminum oxide) and sintered and may be provided as graded granules or powders. The tabular alumina may be graded (i.e., separated by size) to about 44 microns or more, 100 microns or more, or even 500 microns or more. The tabular alumina may be graded to about 4,760 microns or less, 4,000 microns or less, or even 2,000 microns or less.

The tabular alumina may be present in an amount of about 0.1% or more, 1% or more, or even 4% or more, by weight A-side, B-side, or both the A-side and B-side in combination. The tabular alumina may be present in an amount of about 15% or less, 12% or less, or even 10% or less, by weight A-side, B-side, or both the A-side and B-side in combination.

The two-part system may include one or more functional additives. The function additives may function to improve various properties of the composition. Non-limiting examples of suitable functional additives may include antioxidants, antiozonants, ultraviolet absorbers, antistatic agents, colorants, coupling agents, curing agents, flame retardants, blowing agents, heat stabilizers, impact modifiers, lubricants, plasticizers, preservatives, processing aids, stabilizers, the like, and any combination thereof.

The viscosity of the A-side, the B-side, or both may be high enough at about 23° C. in order to preclude the two-part system from undesirably flowing into areas adjacent the dispensed bead upon dispensing the two-part system on a workpiece or to control flow (i.e., permit a desired amount of flow) into areas adjacent the dispensed bead upon dispensing the two-part system. The viscosity of the A-side, B-side, or both, needed to preclude undesirable flow or control flow may depend on the size of the bead dispensed.

For example, the thicker the bead of the two-part system dispensed, the higher the viscosity needed to preclude unintended flow or control flow.

The viscosity of the A-side at 23° C. may be from about 20,000 cP to about 50,000 cP or even from about 35,000 cP to about 45,000 cP, as measured according to ASTM D445-21. The viscosity of the A-side at 10° C. may be from about 280,000 cP to about 350,000 cP or even from about 300,000 cP to about 325,000 cP, as measured according to ASTM D445-21. The viscosity of the B-side at 23° C. may be from about 20,000 cP to about 50,000 cP or even from about 35,000 cP to about 45,000 cP, as measured according to ASTM D445-21. The viscosity of the B-side at 10° C. may be from about 130,000 cP to about 220,000 cP or even from about 175,000 cP to about 195,000 cP, as measured according to ASTM D445-21. The viscosity of the combined A-side and B-side at 23° C. may be from about 250,000 cP to about 400,000 cP, as measured according to ASTM D445-21.

The two-part system may foam, upon mixing the A-side and B-side. The two-part system may foam more than about 50%, more than about 100%, more than about 200%, or even more than about 300% the two-part system's original volume. The two-part system may foam less than about 800%, less than about 700%, less than about 600%, or even less than about 500% the original volume of the two-part system.

The two-part system may be free of curing agents, curing accelerators, or both. Typical curing agents may include lewis bases (i.e., anionic catalysts), lewis acids (i.e., cationic catalysts), UV catalysts, amines, anhydrides, phenols, thiols, or any combination thereof. In place of the aforementioned curing agents, the two-part system may cure upon a polymerization reaction, catalyzed by phosphoric acid, between phosphate esters and epoxide groups, hydroxy groups, or both. The two-part system may be both cured and caused to expand by the chemical interaction between phosphate ester and metal carbonate. It has been found by the present inventors that utilizing the cure and expansion system of the present disclosure may reduce the complexity of formulations by reducing the number of overall components (i.e., curing agents, curing accelerators, and blowing agents). However, the achievement of a desired expansion and time to cure is made more challenging to tune.

The two-part system may include one or more of the following in the A-side ("first component"): liquid epoxy resin, flexible epoxy resin, aliphatic multifunctional epoxy resin, reactive diluent, aramid pulp, medium fine calcium carbonate, fine calcium carbonate, hydrophobic silica, and Wollastonite. The two-part system may include one or more of the following in the B-side ("second component"): a first phosphate ester, a second phosphate ester, a third phosphate ester, an aramid fiber, and hydrophobic silica.

The two-part system may be mixed together at a ratio from 1:4 to 4:1, A-side to B-side. The two-part system may be mixed together at a ratio from 1:2 to 2:1, A-side to B-side. The two-part system may be mixed together at a ratio of 1:1, A-side to B-side. The two-part system may be mixed together at a ratio of 2:1, A-side to B-side.

A non-limiting example formulation ranges in accordance with the present teachings is provided below in Table 1.

TABLE 1

| | Weight % |
|---|---|
| First Component (A-Side) | |
| Liquid epoxy resin | 6.0-10.0 |
| Flexible epoxy resin | 35.0-45.0 |

TABLE 1-continued

| | Weight % |
|---|---|
| Aliphatic multifunctional epoxy resin | 8.0-16.0 |
| Reactive diluent | 8.0-16.0 |
| Aramid fiber | 0.1-1.0 |
| Calcium carbonate (medium fine) | 13.0-18.0 |
| Calcium carbonate (fine) | 4.0-8.0 |
| Fumed silica | 0.5-2.0 |
| Wollastonite | 3.0-7.0 |
| Second Component (B-Side) | |
| First phosphate ester | 25.0-35.0 |
| Second phosphate ester | 15.0-25.0 |
| Third phosphate ester | 35.0-45.0 |
| Aramid pulp | 0.1-1.0 |
| Fumed silica | 3.0-5.0 |

The method may comprise one or more of the following steps. Some of the steps may be duplicated, removed, rearranged relative to other steps, combined into one or more steps, separated into two or more steps, or any combination thereof.

The present disclosure provides for a method for fabricating a frame assembly, the method may comprise providing a bracket. The bracket may comprise a base member including a first projection extending from a first side. The first projection may define a cavity. The method may comprise situating an end of a member within the cavity and into contacting relationship with an end channel, peripheral channel, or both situated within the cavity. The method may comprise injecting an adhesive into the end channel and/or peripheral channel via a port. The port may be in fluid communication with the end channel and/or peripheral channel. The port may extend from a second side of the base member to the first side of the base member, the second side opposing the first side. The adhesive may permeate the end channel. The method may comprise overmolding a bracket on a member. After overmolding, the method may comprise injecting an adhesive into an end channel and/or peripheral channel via a port. The port may be in fluid communication with the end channel and/or peripheral channel. The port may extend from a second side of the base member to the first side of the base member, the second side opposing the first side. The adhesive may permeate the end channel and/or peripheral channel. The method may further include a step of curing the adhesive at a temperature of about 0° C. to about 50° C., more preferably about 10° C. to about 40° C., more preferably about 10° C. to about 30° C., or even more preferably about 23° C.

Figure 5:
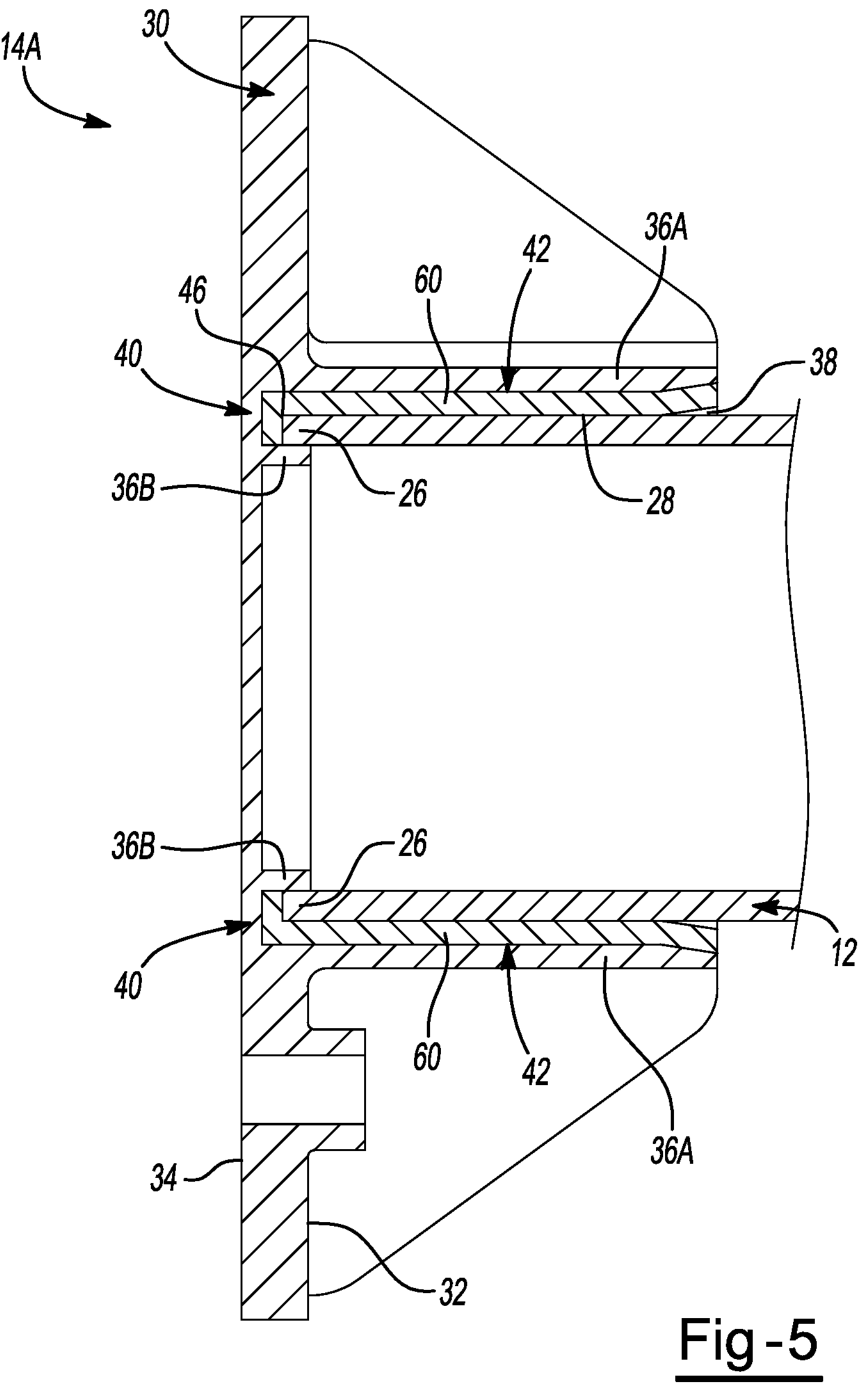
FIG. 5 shows a cross-sectional view of an exemplary frame assembly in accordance with the present teachings.

FIG. 1 shows a perspective view of a frame assembly 10. The frame assembly 10 includes a member 12 coupled to a left-hand connector device 14A and a right-hand connector device 14B. An end 26 of the member 12, as shown in FIG. 5, is situated within the left-hand connector device 14A and likewise an opposing end 26 of the member 12 is situated within the right-hand connector device 14B. The member 12 is structurally supported between the left-hand connector device 14A and the right-hand connector device 14B.

Figure 2:
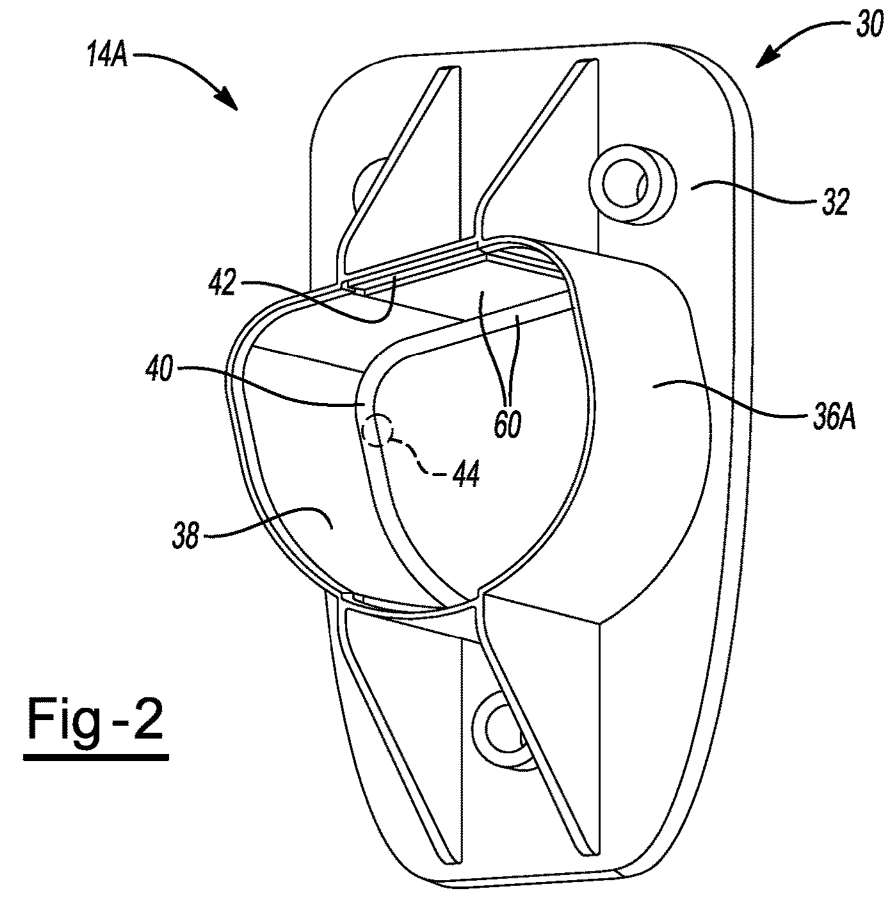
FIG. 2 shows a plan view of the left-hand connector device shown in FIG. 1.
Figures 3, 4:
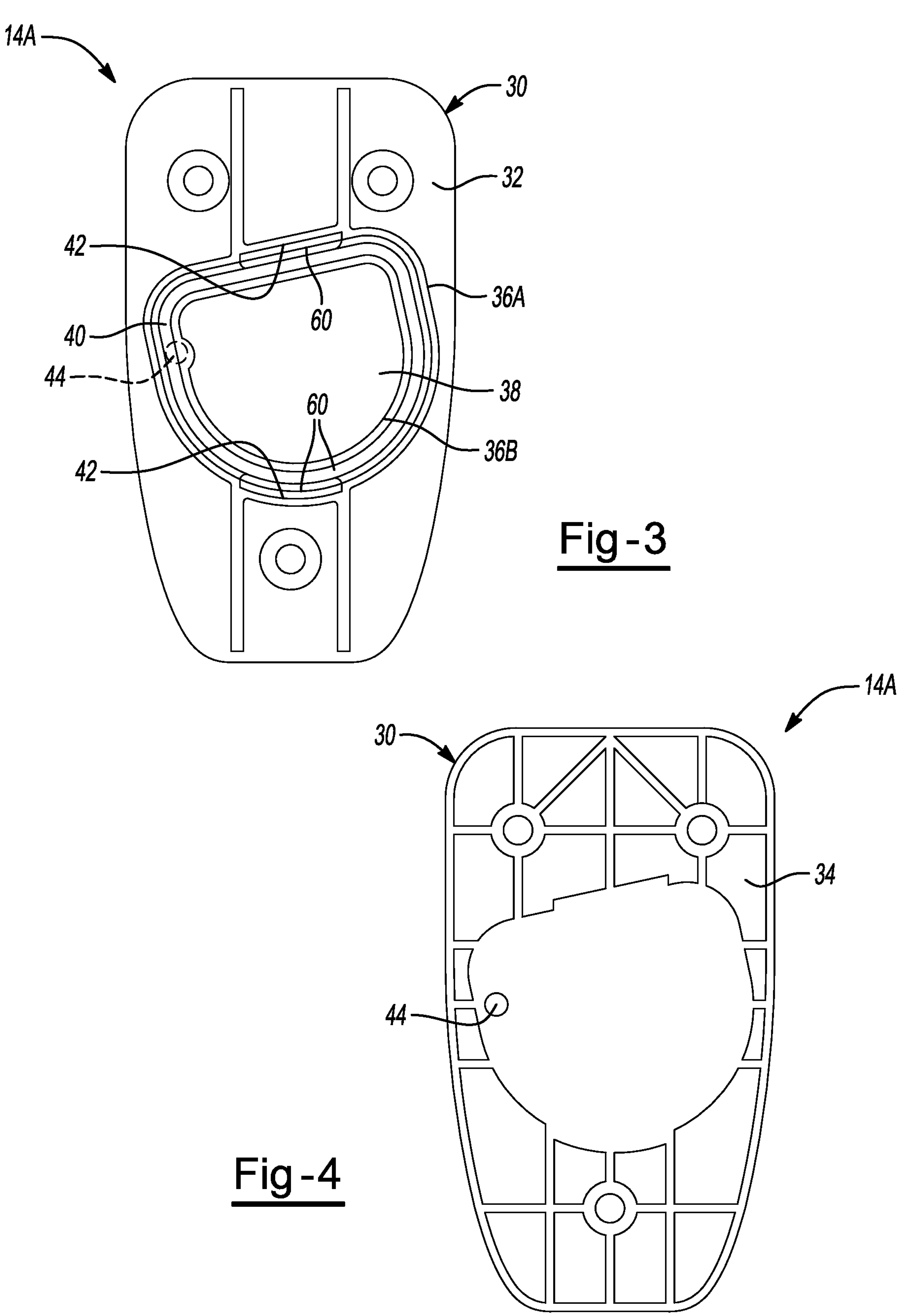
FIG. 3 shows a plan view of the left-hand connector device shown in FIG. 1.
FIG. 4 shows a plan view of the left-hand connector device shown in FIG. 1.

FIG. 2 and FIG. 3 illustrates the left-hand connector device 14B, as shown in FIG. 1. The left-hand connector device 14B comprises a base member 30 including a first side 32 and a second side 34 shown in FIG. 4. A first projection 36A extends from the first side 32 and defines a cavity 38 therein. The base member 30 further includes an end channel 40 and a peripheral channel 42.

The end channel 40 is situated within the cavity 38 and extends around an inner perimeter of the first projection 36A. The end channel 40 is defined between the first projection 36A and a second projection 36B. The second projection 36B extends from the base member 30 within the cavity 38 and is coaxial with the first projection 36A. The end channel 40 is in fluid communication with a port 44.

The peripheral channel 42 extends from the first side 32 of the base plate 30. The peripheral channel 42 is defined by a groove formed in the first projection 36A. The peripheral channel 42 extends along the first projection 36A and toward an end of the first projection 36A opposing an end interfacing with the base member 30. The peripheral channel 42 is in fluid communication with the end channel 40 and an adhesive 60 is situated therein. The peripheral channel 42 includes an adhesive 60 disposed therein.

FIG. 4 shows a plan view of the left-hand bracket 14A, shown in FIGS. 1-3. The left-hand bracket 14A comprises a base member 30 including a first side 32, shown in FIGS. 2-3, and a second side 34. A port 44 is accessible via the second side 34. The port 44 extends between the first side 32 and the second side 34 and the port 44 is in fluid communication with the end channel 40 and the peripheral channel 42, shown in FIGS. 2-3. Adhesive 60 delivered into the port 44 fills the end channel 40 and when it reaches the peripheral channel 42, fills the peripheral channel 42.

FIG. 5 shows a sectional view of a frame assembly 10. The left-hand bracket 14A comprises a base member 30 including a first side 32 and a second side 34. A first projection 36A extends from the first side 32 and defines a cavity 38 therein. A portion of a member 12 is situated within the cavity 38. The base member 30 comprises an end channel 40 and a peripheral channel 42.

The end channel 40 is situated within the cavity 38 and extends around an inner perimeter of the first projection 36A. The end channel 40 is defined by the first projection 36A and a second projection 36B. The second projection 36B extends from the base member 30 within the cavity 38 and is coaxial with the first projection 36A.

The peripheral channel 42 extends from the first side 32 of the base member 30 along the first projection 36A. The peripheral channel 42 is defined by a groove formed in the first projection 36A. The peripheral channel 42 extends toward an end of the first projection 36A opposing an end interfacing with the base member 30. The peripheral channel 42 is in fluid communication with the end channel 40 and an adhesive 60 is situated in both. An end 26 of the member 12 is situated partially within the end channel 40, an end edge 46 of the member 12 is in contacting relationship with the adhesive 60 in the end channel 40 and an outer perimeter 28 of the member 12 is in contacting relationship with the adhesive 60 in the peripheral channel 42.

Figure 6:
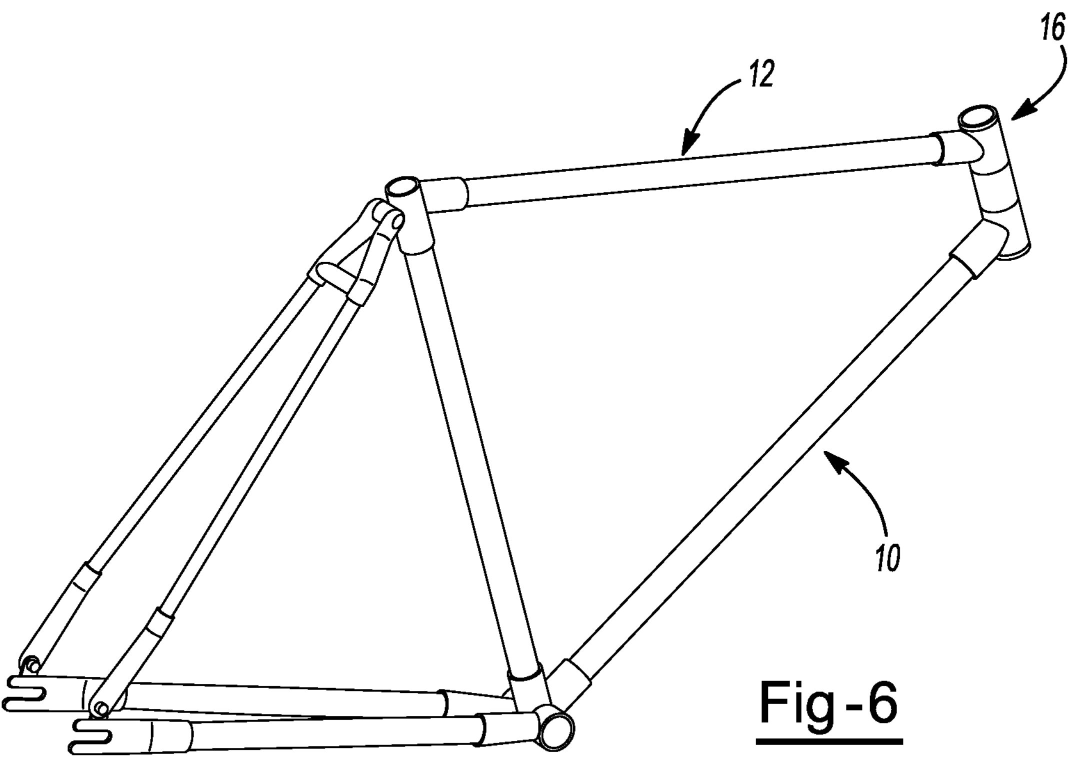
FIG. 6 shows a perspective view of an exemplary frame assembly in accordance with the present teachings.

FIG. 6 shows a perspective view of a frame assembly 10 having a plurality of members 12 connected to connector devices 16 to form the frame assembly 10.

Figure 7:
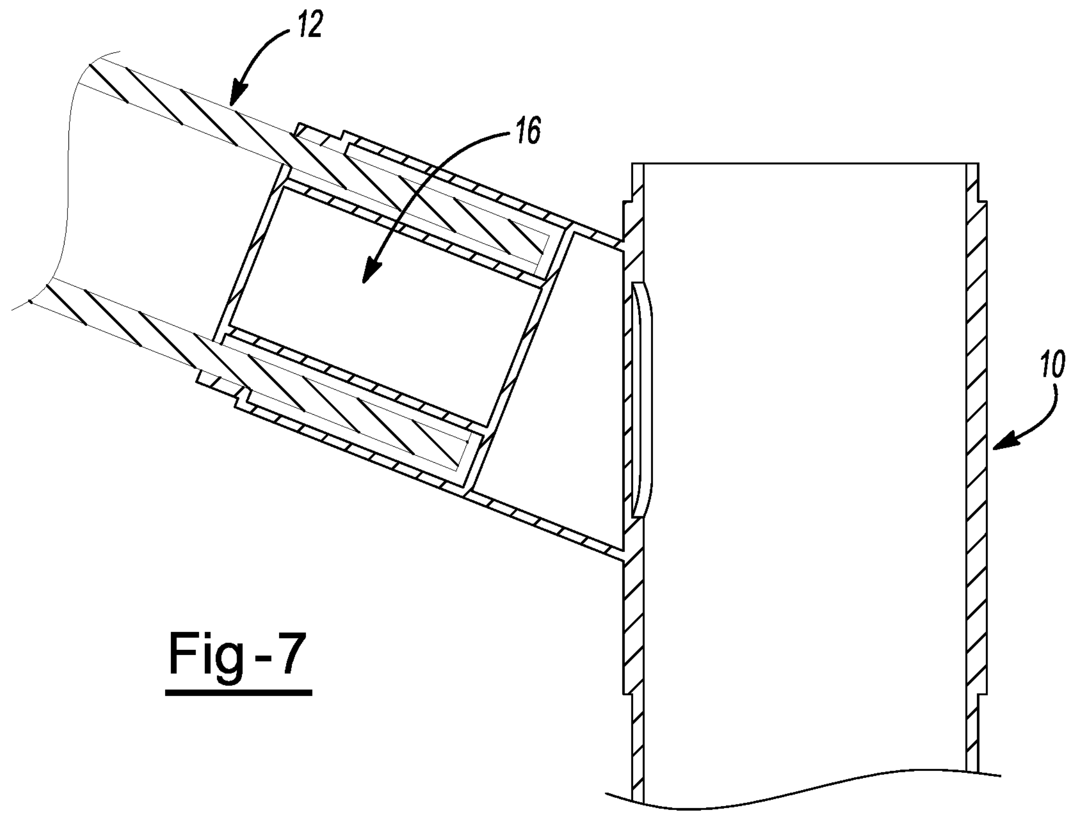
FIG. 7 shows a cross-sectional view of the frame assembly shown in FIG. 6.

FIG. 7 shows a cross-sectional view of the frame assembly 10 shown in FIG. 6. The frame assembly 10 comprises an assembled connector device 16 and member 12.

FIGS. 8-17 show cross-sectional views of the frame assembly 10 shown in FIG. 6. FIGS. 8-17 illustrate exemplary ways in which the adhesive 60 is applied to the frame assembly 10.

Figure 8:
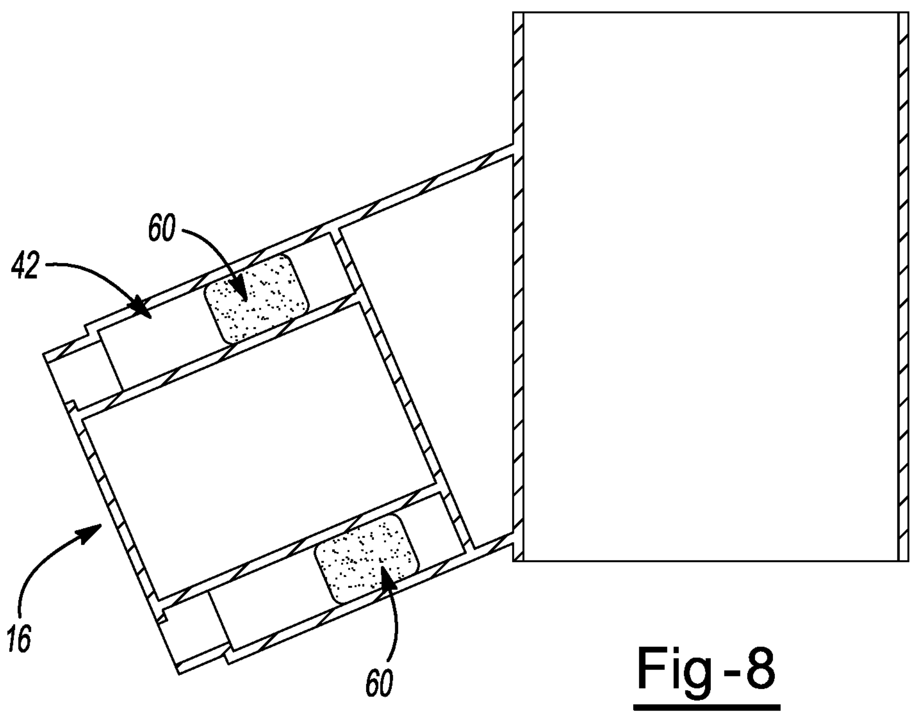
FIG. 8 shows a cross-sectional view of the frame assembly shown in FIG. 6.
Figure 9:
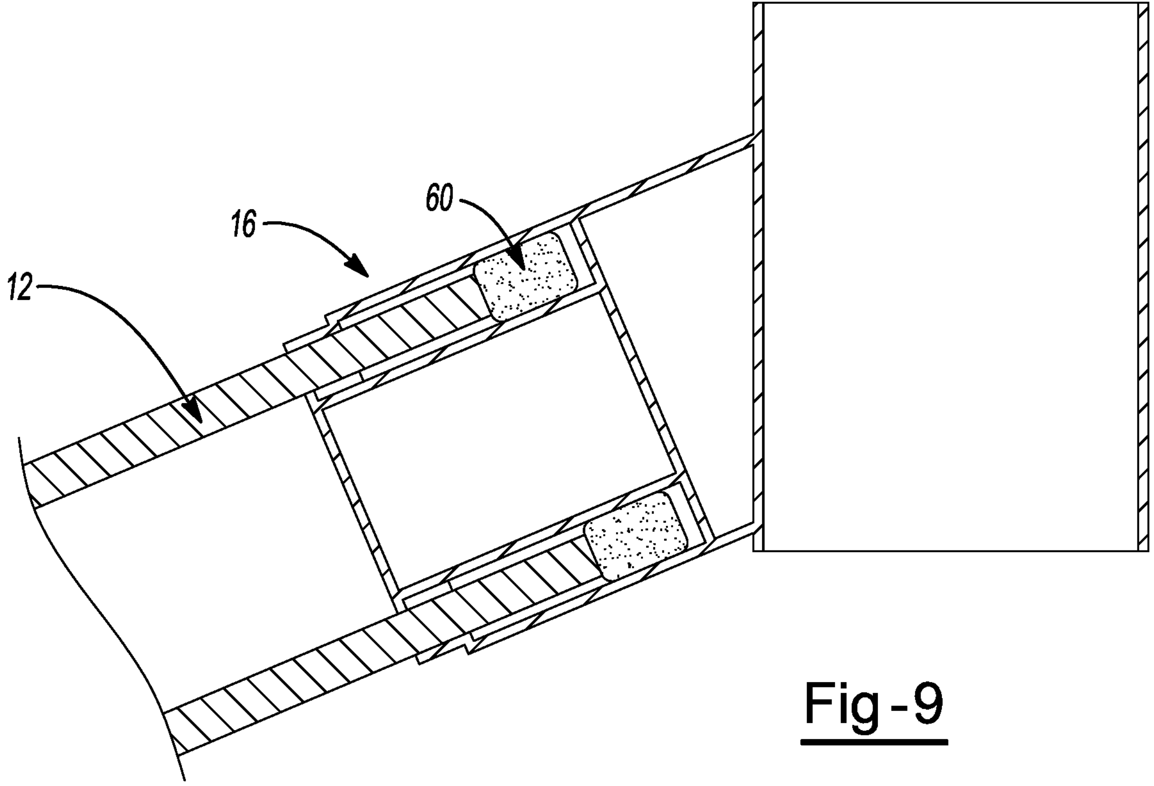
FIG. 9 shows a cross-sectional view of the frame assembly shown in FIG. 6.

For example, in FIGS. 8-9 the adhesive 60 is applied within a channel 42 of the connector device 16 so that when the member 12 shown in FIG. 9 is located into the connector device 16, the member 12 contacts the adhesive 60 to secure the member 12 within the connector device 16, as shown in FIG. 9.

Figures 10, 11:
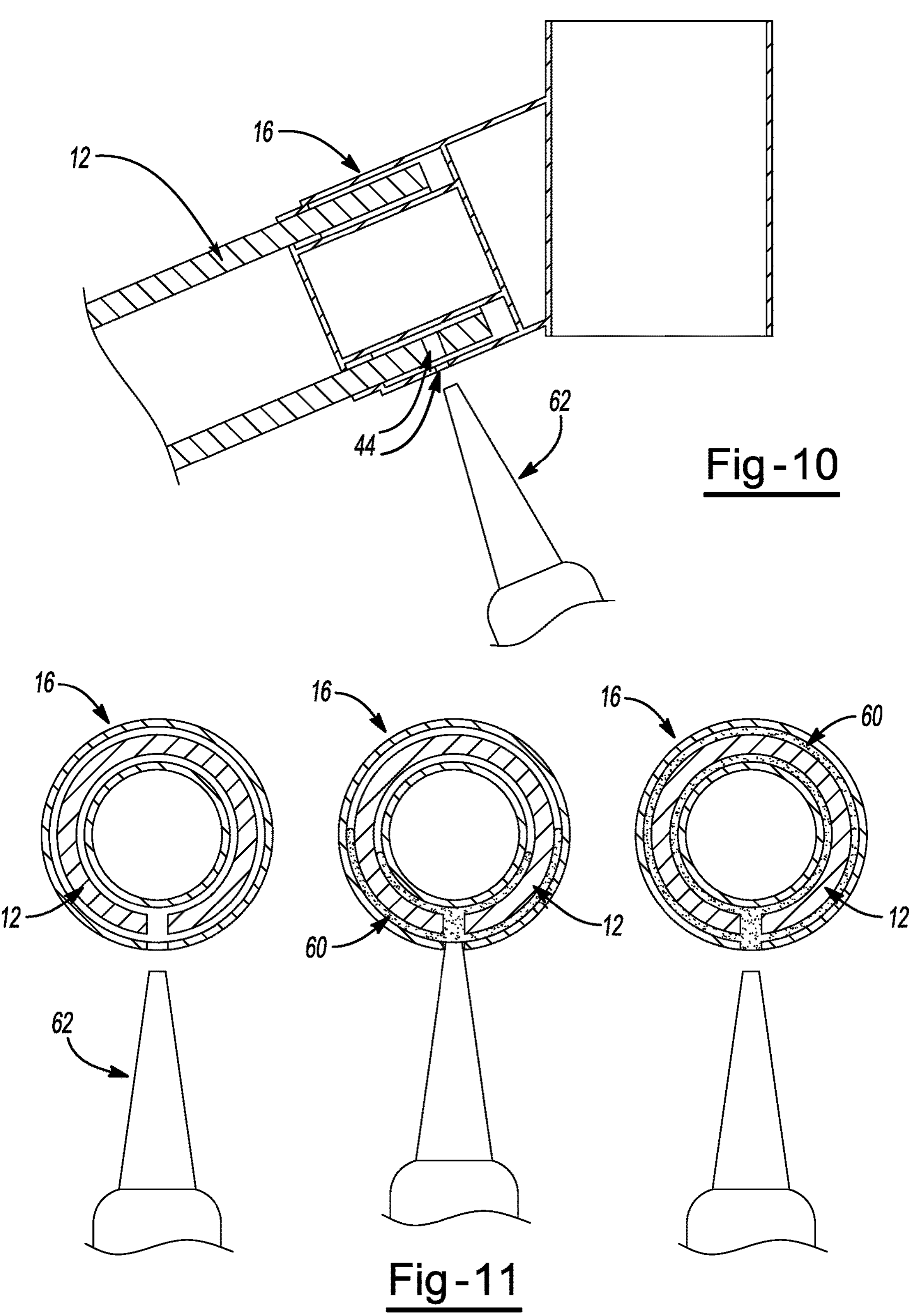
FIG. 10 shows a cross-sectional view of the frame assembly shown in FIG. 6.
FIG. 11 shows a cross-sectional view of the frame assembly shown in FIG. 6.

As another example, in FIGS. 10-11, the connector device 16 includes a port 44 through which adhesive 60 is received into the connector device 60 via an adhesive applicator 62. A corresponding port 44 is formed in the member 12 to allow the adhesive to flow through and around both the member 12 and the connector device 16. The adhesive 60 is sufficiently mobile so that it travels through the ports 44 and around the connector device 16 into contact with the member 12. The adhesive 60 flows into place as shown in FIG. 11.

Figure 12A:
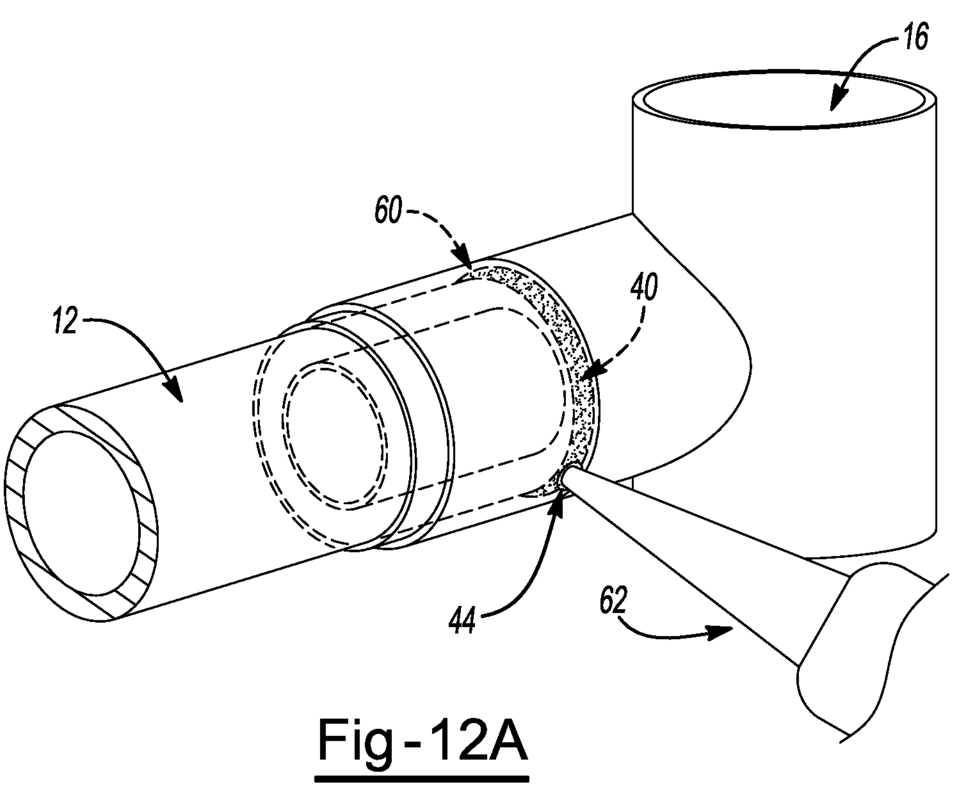
FIG. 12A shows a cross-sectional view of the frame assembly shown in FIG. 6.
Figure 13:
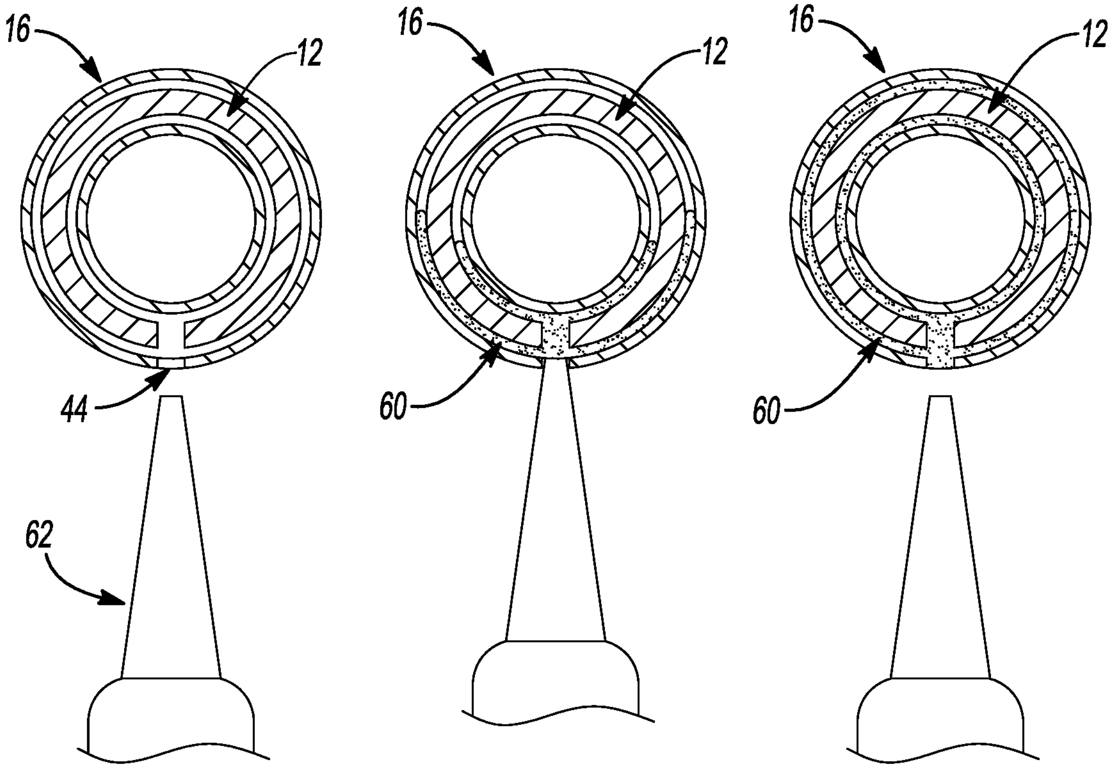
FIG. 13 shows a cross-sectional view of the frame assembly shown in FIG. 6.

As another example, FIG. 12A also includes a port 44 and adhesive applicator 62, but instead includes a channel 40 located at the base of the connector device 16. The channel 40 allows the adhesive 60 to flow around both the member 12 and connector device 16 as shown in FIG. 13.

Figure 12B:
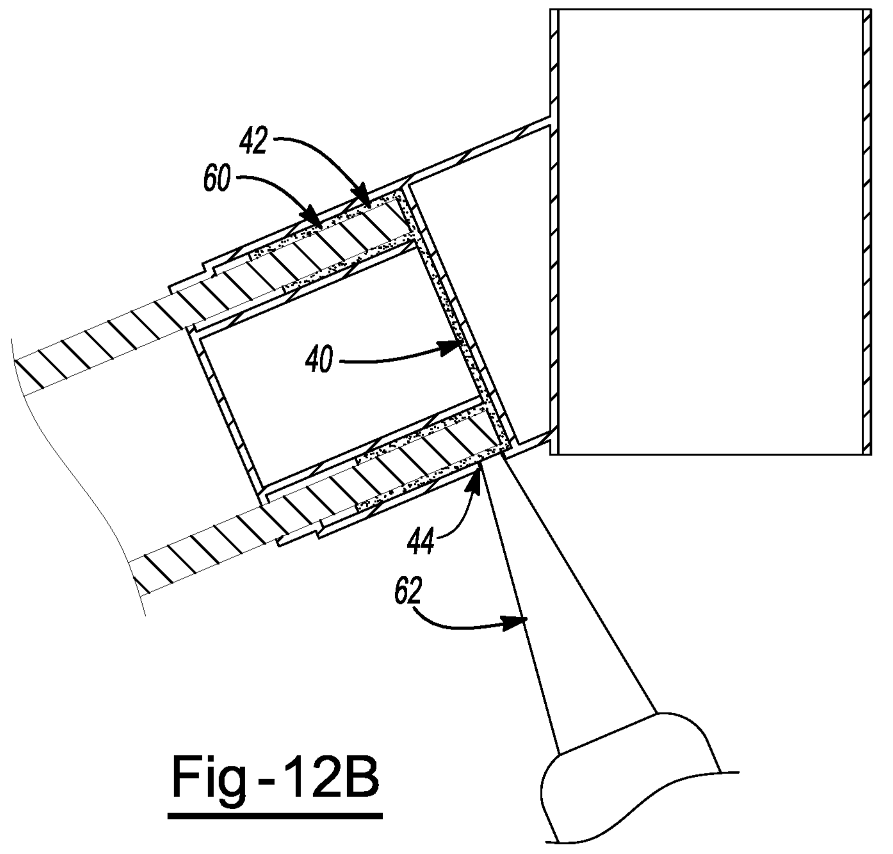
FIG. 12B shows a cross-sectional view of the frame assembly shown in FIG. 6.

As another example, FIG. 12B also includes a port 44 and adhesive applicator 62. A channel 40 located at the base of the connector device 16 is present as well as a channel 42 running along a length of the member 12, between the member 12 and connector device 16. The channels 40, 42 allow the adhesive 60 to flow around both the member 12 and connector device 16 as shown in FIG. 13.

Figures 14, 15A, 15B:
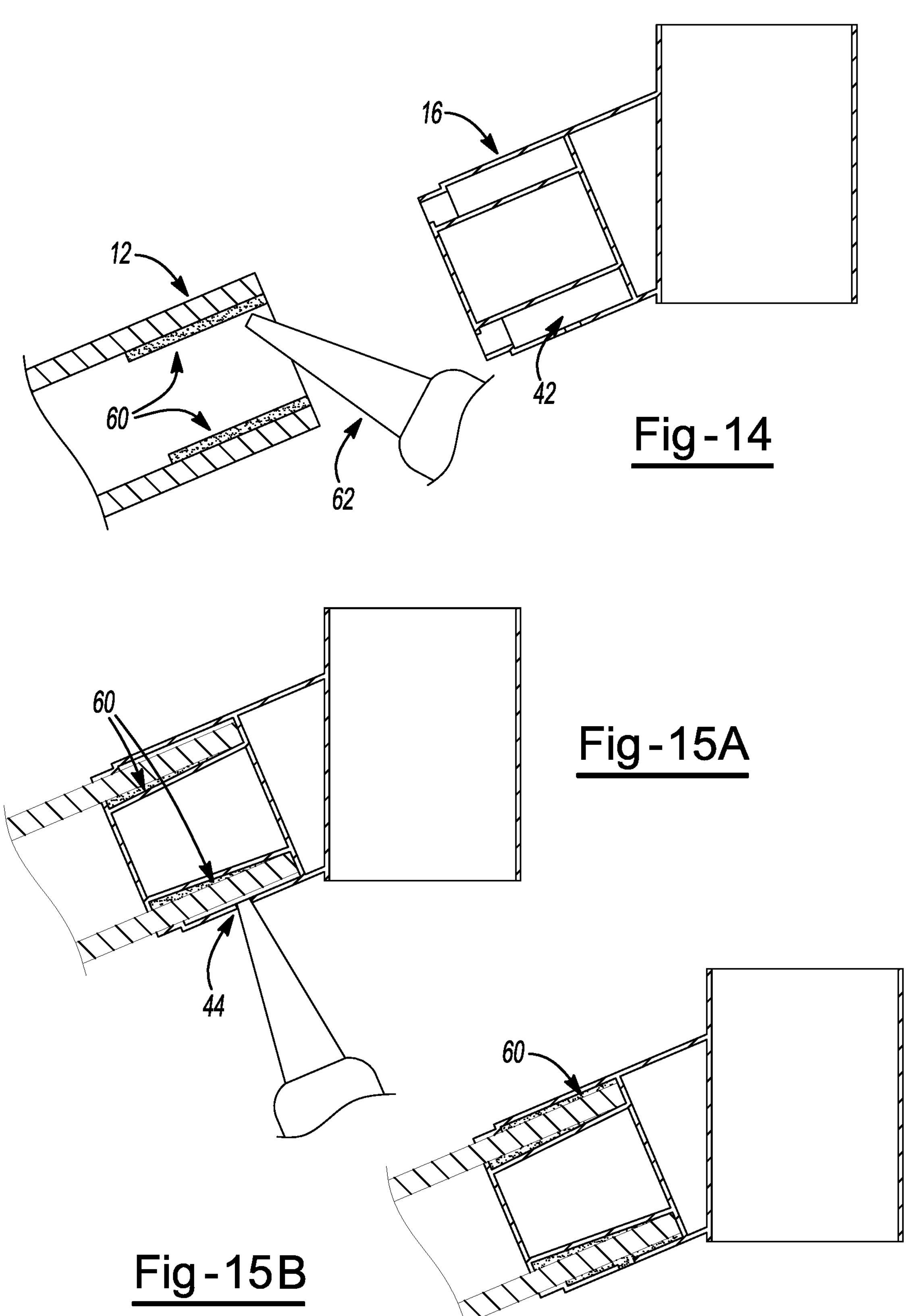
FIG. 14 shows a cross-sectional view of the frame assembly shown in FIG. 6.
FIG. 15A shows a cross-sectional view of the frame assembly shown in FIG. 6.
FIG. 15B shows a cross-sectional view of the frame assembly shown in FIG. 6.

As another example, in FIG. 14 the adhesive 60 is located along the member 12 prior to locating the member 12 into the connector device 16. The applicator 62 applies the adhesive 60 along an inner wall portion of the member 12 and the channels 42 in the connector device 16 are tapered to receive the member 12 and adhesive 60. Once the member 12 is inserted, as shown in FIG. 15A, the applicator 62 can utilize the port 44 to apply adhesive 60 to the outer wall of the connector device 16, as shown in FIG. 15B.

Figures 16, 17A, 17B:
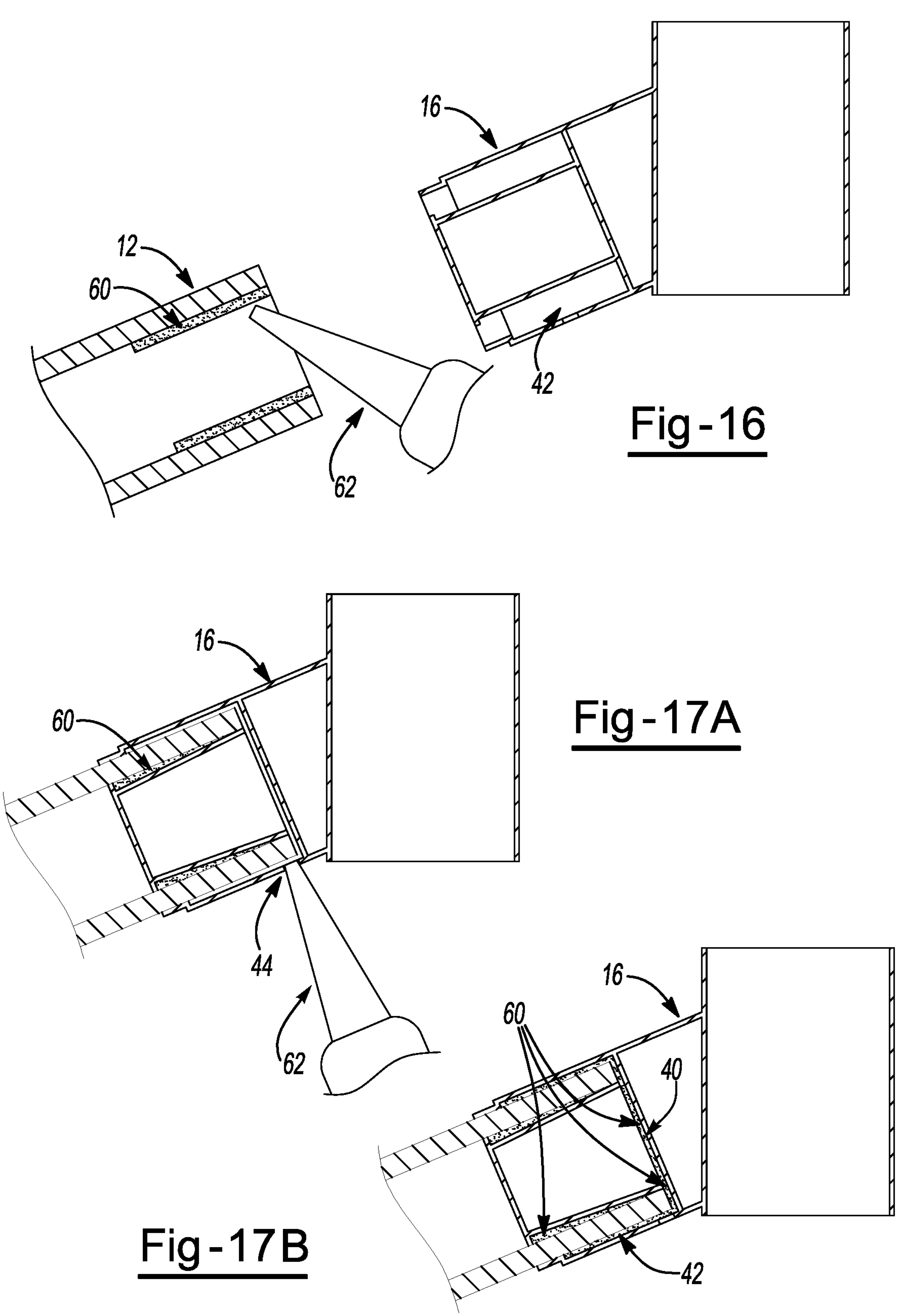
FIG. 16 shows a cross-sectional view of the frame assembly shown in FIG. 6.
FIG. 17A shows a cross-sectional view of the frame assembly shown in FIG. 6.
FIG. 17B shows a cross-sectional view of the frame assembly shown in FIG. 6.

As another example, FIGS. 16, 17A, and 17B combine the concepts of FIGS. 12A, 12B, 13, 14, 15A, and 15B. Similar to FIGS. 14, 15A, and 15B, the adhesive 60 is located along an inner wall portion of the member 12 prior to locating the member 12 into the connector device 16. The applicator 62 applies the adhesive 60 along the inner wall portion of the member 12 and the channels 42 in the connector device 16 are tapered to receive the member 12 and adhesive 60. Once the member 12 is inserted, as shown in FIG. 17A, the applicator 62 can utilize the port 44 to apply adhesive 60 to the channel 42 extending around the outer wall of the connector device 16. Moreover, as can be seen in FIG. 17B, the adhesive 60 also travels through the channel 40 located at the base of the connector device 16.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, from 20 to 80, or from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. Unless otherwise stated, all ranges include both endpoints and all numbers between the endpoints.

As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

REFERENCE NUMERALS

10 Step assembly or frame assembly
12 Step or member
14A Left-hand connector device or bracket
14B Right-hand connector device or bracket
16 Connector device
26 End
28 Perimeter
30 Base plate or base member
32 First side
34 Second side
36A First projection
36B Second Projection
38 Cavity
40 End channel
42 Peripheral channel
44 Port
46 End edge
60 Adhesive
62 Applicator

What is claimed is:

1. A frame assembly comprising:
an elongated member, and
a connector device coupled to and support an end of the elongated member, the connector device comprising:
a base member,
a first projection extending from a first side of the base member, the first projection defining a cavity;
an end channel situated within the cavity and extending around a perimeter of the first projection on the base member,
a port extending from the end channel on the first side of the base member to a second side of the base member, the second side being in opposing relationship to the first side; and
an adhesive, configured to be introduced via the port, situated within the end channel at least between the first side of the base member and the end of the elongated member; and
a peripheral channel extending from the first side of the base member along the first projection toward an opposing end of the first projection that is distal from the base member, wherein the adhesive is situated within the peripheral channel;
wherein the end of the elongated member is situated within the cavity of the connector device and in contacting relationship with the adhesive.

2. The frame assembly according to claim 1, wherein the end channel is defined by a space between the first projection and a second projection that extends from the first side of the base member and is situated within the first projection or a groove formed in the first side of the base member.

3. The frame assembly according to claim 1,
wherein the peripheral channel is in the form of a groove defined into the first projection; and
wherein the peripheral channel is in fluid communication with the end channel.

4. The frame assembly according to claim 3, wherein the adhesive comprises a two-part phosphate ester elastomeric epoxy composition comprising:
a first component including: one or more epoxy resins selected from liquid or solid epoxy resins, flexible epoxy resins, or aliphatic multifunctional epoxy resins; one or more reactive diluents; and one or more first component additives; and
a second component including: one or more phosphate esters including a first phosphate ester, an optional second phosphate ester, and an optional third phosphate ester; and one or more second component additives.

5. The frame assembly according to claim 4, wherein the two-part phosphate ester elastomeric epoxy composition, upon mixing, cures at a temperature of about 0° C. to about 50° C.

6. The frame assembly according to claim 3, wherein at least a portion of a profile of the port is disposed within a profile of the end channel, as viewed along an axis extending through the port from the first side of the base member to the second side of the base member; and wherein the profile of the port is offset from a profile of the peripheral channel.

7. The frame assembly according to claim 1, wherein the peripheral channel extends around less than a full extent of an inner perimeter of the first projection.

8. The frame assembly according to claim 7, further comprising a second peripheral channel in a generally opposing relationship to the peripheral channel.

9. A method for fabricating a frame assembly comprising:

providing a connector device comprising (a) a base member, (b) a projection extending from a first side of the base member and defining a cavity, and (c) a peripheral channel extending from the first side of the base member, along the projection, toward an end of the projection that is distal from the base member;

situating an end of an elongated member within the cavity and into contacting relationship with an end channel situated within the cavity; and injecting an adhesive into the end channel and the peripheral channel via a port in fluid communication with the end channel, the port extending from a second side of the base member to the first side of the base member, the second side opposing the first side; and wherein the adhesive permeates the end channel.

10. The method according to claim 9, wherein the method comprises curing the adhesive at a temperature of about 0° C. to about 50° C.

11. The method according to claim 10, wherein the peripheral channel is in fluid communication with the end channel.

12. The method according to claim 11, wherein the adhesive comprises a two-part phosphate ester elastomeric epoxy composition comprising:

a first component including: one or more epoxy resins selected from liquid or solid epoxy resins, flexible epoxy resins, or aliphatic multifunctional epoxy resins; one or more reactive diluents; and one or more first component additives; and a second component including: one or more phosphate esters including a first phosphate ester, an optional second phosphate ester, and an optional third phosphate ester; and one or more second component additives.

13. A frame assembly comprising:

an elongated member, and a connector device coupled to and supporting an end of the elongated member, the connector device including: a cavity within the connector device, a channel situated within the cavity and extending at least partially around an interior perimeter of the connector device, and a port in fluid communication with the channel and located in a wall portion of the connector device; and an adhesive, configured to be introduced via the port, situated within the channel; wherein the elongated member comprises a port located along a wall thereof; and wherein the port of the elongated member aligns with the port of the connector device.

14. The frame assembly according to claim 13, wherein the frame assembly is a bicycle frame or a ladder frame.

15. The frame assembly according to claim 14, wherein the adhesive comprises a two-part phosphate ester elastomeric epoxy composition comprising:

a first component including: one or more epoxy resins selected from liquid or solid epoxy resins, flexible epoxy resins, or aliphatic multifunctional epoxy resins; one or more reactive diluents; and one or more first component additives; and a second component including: one or more phosphate esters including a first phosphate ester, an optional second phosphate ester, and an optional third phosphate ester; and one or more second component additives.

16. The frame assembly according to claim 15, wherein the frame assembly comprises a second connector device comprising a channel; wherein the channels of the connector device and the second connector device fluidly communicate with each other such that the adhesive is configured to enter the port in fluid communication with the channel thereof and the adhesive is configured to flow from the channel of the connector device and into the channel of the second connector device.

17. The frame assembly according to claim 15, wherein the channel is a peripheral channel defined by a groove formed into the wall portion or defined by a space between the wall portion and the elongated member.

18. The frame assembly according to claim 17, wherein the connector device comprises a base portion from which the wall portion extends; wherein the connector device comprises a second channel, which is an end channel located on the base portion; and wherein the channel of the connector device and the second channel fluidly communicate with one another.

19. The frame assembly according to claim 17, further comprising a second peripheral channel in a generally opposing relationship to the peripheral channel.

* * * * *